United States Patent
Tang et al.

(10) Patent No.: US 11,306,416 B2
(45) Date of Patent: Apr. 19, 2022

(54) FUNCTIONAL REGENERATED VISCOSE FIBER

(71) Applicant: JINAN SHENGQUAN GROUP SHARE HOLDING CO., LTD., Shandong (CN)

(72) Inventors: Yilin Tang, Shandong (CN); Jinzhu Zhang, Shandong (CN); Shuangcheng Wang, Shandong (CN); Ripeng Xu, Shandong (CN); Ding Liu, Shandong (CN)

(73) Assignee: JINAN SHENGQUAN GROUP SHARE HOLDING CO., LTD., Shandong (CN)

(*) Notice: Subject to any disclaimer, the term of this patent is extended or adjusted under 35 U.S.C. 154(b) by 287 days.

(21) Appl. No.: 15/777,636

(22) PCT Filed: Nov. 14, 2016

(86) PCT No.: PCT/CN2016/105641
§ 371 (c)(1),
(2) Date: May 18, 2018

(87) PCT Pub. No.: WO2017/084542
PCT Pub. Date: May 26, 2017

(65) Prior Publication Data
US 2018/0355517 A1    Dec. 13, 2018

(30) Foreign Application Priority Data
Nov. 26, 2015    (CN) .................... 201510849113.3

(51) Int. Cl.
*D01F 8/18*    (2006.01)
*D01F 2/08*    (2006.01)
(Continued)

(52) U.S. Cl.
CPC .............. *D01F 8/18* (2013.01); *C01B 32/182* (2017.08); *C01B 32/184* (2017.08); *D01F 1/103* (2013.01);
(Continued)

(58) Field of Classification Search
CPC ..... D01F 2/00; D01F 2/06; D01F 2/08; D01F 8/18; D21H 5/16–18; D21H 5/148;
(Continued)

(56) References Cited

U.S. PATENT DOCUMENTS

| 2011/0014111 A1 | 1/2011 | Leugers et al. |
| 2011/0284805 A1 | 11/2011 | Samulski et al. |

(Continued)

FOREIGN PATENT DOCUMENTS

| CN | 101618870 A | 1/2010 |
| CN | 102142558 A | 8/2011 |

(Continued)

OTHER PUBLICATIONS

International Preliminary Report on Patentability issued in PCT/CN2016/104933 [English translation included], dated May 31, 2018, 17 pages.

(Continued)

*Primary Examiner* — Matthew D Matzek
(74) *Attorney, Agent, or Firm* — Faegre Drinker Biddle & Reath LLP

(57) ABSTRACT

A functional regenerated cellulose fiber includes a graphene structure and non-carbon non-oxygen elements. The non-carbon non-oxygen elements includes elements of Fe, Si, and Al. The elements of Fe, Si, and Al account for 0.018 wt % to 0.8 wt % of the regenerated cellulose fiber.

12 Claims, 1 Drawing Sheet

(51) Int. Cl.
  *D01F 1/10*  (2006.01)
  *C01B 32/182*  (2017.01)
  *D01F 2/00*  (2006.01)
  *C01B 32/184*  (2017.01)
  *D01F 8/02*  (2006.01)
  *A24D 3/00*  (2020.01)
  *D01F 2/06*  (2006.01)
  *D21H 13/08*  (2006.01)

(52) U.S. Cl.
  CPC ............... *D01F 1/106* (2013.01); *D01F 2/00* (2013.01); *D01F 2/08* (2013.01); *D01F 8/02* (2013.01); *A24D 3/00* (2013.01); *D01F 2/06* (2013.01); *D10B 2101/122* (2013.01); *D10B 2201/20* (2013.01); *D10B 2201/22* (2013.01); *D10B 2201/24* (2013.01); *D21H 5/148* (2013.01)

(58) Field of Classification Search
  CPC .... C01B 32/182–184; D10B 2101/122; D10B 2201/20; D10B 2201/22; D10B 2201/24; B29K 2601/00; A24D 3/00
  USPC ................ 977/734; 162/157.1, 157.6, 157.7; 428/311.71; 131/202, 203; 264/187, 188
  See application file for complete search history.

(56) References Cited

U.S. PATENT DOCUMENTS

| | | | | |
|---|---|---|---|---|
| 2012/0000845 | A1* | 1/2012 | Park | B01D 69/10 210/500.25 |
| 2012/0244333 | A1* | 9/2012 | Aksay | C08K 3/042 428/221 |
| 2017/0107650 | A1* | 4/2017 | Chou | D01F 13/00 |
| 2017/0137293 | A1 | 5/2017 | Tang et al. | |
| 2018/0273387 | A1 | 9/2018 | Tang et al. | |
| 2018/0327567 | A1 | 11/2018 | Tang et al. | |

FOREIGN PATENT DOCUMENTS

| | | | | |
|---|---|---|---|---|
| CN | 102306757 | A | | 1/2012 |
| CN | 102530928 | A | | 7/2012 |
| CN | 102732037 | A | | 10/2012 |
| CN | 103005712 | A | * | 4/2013 |
| CN | 103046151 | A | | 4/2013 |
| CN | 103046151 | A | * | 4/2013 |
| CN | 103131018 | A | | 6/2013 |
| CN | 103466613 | A | | 12/2013 |
| CN | 103508444 | A | | 1/2014 |
| CN | 103579596 | A | | 2/2014 |
| CN | 103647043 | A | | 3/2014 |
| CN | 103691446 | A | | 4/2014 |
| CN | 103898782 | A | | 7/2014 |
| CN | 104009235 | A | | 8/2014 |
| CN | 104016341 | A | | 9/2014 |
| CN | 104118873 | A | | 10/2014 |
| CN | 104118874 | A | | 10/2014 |
| CN | 104164707 | A | | 11/2014 |
| CN | 104177766 | A | | 12/2014 |
| CN | 104194252 | A | | 12/2014 |
| CN | 104211058 | A | | 12/2014 |
| CN | 104231539 | A | | 12/2014 |
| CN | 104292745 | A | | 1/2015 |
| CN | 104328523 | A | | 2/2015 |
| CN | 104332613 | A | | 2/2015 |
| CN | 104357941 | A | | 2/2015 |
| CN | 104562276 | A | | 4/2015 |
| CN | 104610557 | A | | 5/2015 |
| CN | 104630928 | A | | 5/2015 |
| CN | 104724699 | A | | 6/2015 |
| CN | 104787750 | A | | 7/2015 |
| CN | 104817746 | A | | 8/2015 |
| CN | 104831389 | A | | 8/2015 |
| CN | 104891479 | A | | 9/2015 |
| CN | 105001601 | A | | 10/2015 |
| CN | 105037835 | A | | 11/2015 |
| CN | 105295090 | A | | 2/2016 |
| CN | 105502330 | A | | 4/2016 |
| CN | 105504199 | A | | 4/2016 |
| CN | 105504341 | A | | 4/2016 |
| CN | 105506765 | A | | 4/2016 |
| CN | 105525384 | A | | 4/2016 |
| CN | 105586658 | A | | 5/2016 |
| CN | 105603568 | A | | 5/2016 |
| CN | 105623002 | A | | 6/2016 |
| KR | 20120063857 | A | | 6/2012 |
| KR | 20120082287 | A | | 7/2012 |
| KR | 2012-0116328 | A | | 10/2012 |
| RU | 2470699 | C1 | | 12/2012 |
| WO | WO-2007113219 | A1 | * | 10/2007 ......... H01M 8/0234 |
| WO | 2010/045887 | A1 | | 4/2010 |
| WO | 2010107762 | A1 | | 9/2010 |

OTHER PUBLICATIONS

International Preliminary Report on Patentability issued in PCT/CN2016/105641 [English translation inclusive], dated May 31, 2018, 12 pages.
International Search Report and Written Opinion issued in PCT/CN2016/093115, dated Sep. 21, 2016, 6 pages.
International Search Report and Written Opinion issued in PCT/CN2016/099750 with Translation of ISR, dated Dec. 29, 2016, 16 pages.
International Search Report iossued in PCT/CN2016/106435, dated Feb. 17, 2017, 4 pages.
International Search Report issued in PCT/CN2016/104933, dated Jan. 24, 2017, 4 pages.
International Search Report issued in PCT/CN2016/105641, dated Feb. 17, 2017, 6 pages.
International Search Report issued in PCT/CN2016/106434, dated Feb. 23, 2017, 4 pages.
Written Opinion issued in PCT/CN2016/105641 [English translation inclusive], dated Feb. 17, 2017, 9 pages.
Written Opinion of the International Searching Authority issued PCT/CN2016/104933 [English translation included], dated Jan. 24, 2017, 15 pages.
EP Office Action dated Oct. 17, 2019 for EP Application No. 16865799.
Genovese, M., Jiang, J., Lian, K., and Holm, N. (2015). High capacitive performance of exfoliated biochar nanosheets from biomass waste corn cob. Journal of Materials Chemistry A, pp. 2903-2913, DOI: 10.1039/c4a06110a.
Hong, J. et al. (2013). Origin of New Broad Raman D and G Peaks in Annealed Graphene. Scientific Reports, 3(2700):1-5.
IN Office Action dated Feb. 25, 2019 for IN Application No. 201727030640.
Non-Final Rejection dated Aug. 21, 2019 for U.S. Appl. No. 15/521,534.
Office Action issued in Russian patent application No. 2017129230/5, dated Dec. 24, 2018 (With English translation), 13 pages.
Outgoing—ISA/210—International Search Report dated Dec. 29, 2016 for WO Application No. PCT/CN16/099750.
Outgoing—ISA/210—International Search Report dated Feb. 17, 2017 for WO Application No. PCT/CN16/105641.
Outgoing—ISA/210—International Search Report dated Feb. 17, 2017 for WO Application No. PCT/CN16/106435.
Outgoing—ISA/210—International Search Report dated Feb. 23, 2017 for WO Application No. PCT/CN16/106434.
Outgoing—ISA/210—International Search Report dated Jan. 24, 2017 for WO Application No. PCT/CN16/104933.
Outgoing—ISA/210—International Search Report dated Sep. 21, 2016 for WO Application No. PCT/CN16/093115.

(56) References Cited

OTHER PUBLICATIONS

Pinto, J., Cruz, et al. (2012). Characterization of corn cob as a possible raw building material. Construction and Building Materials, 34:28-33.

* cited by examiner

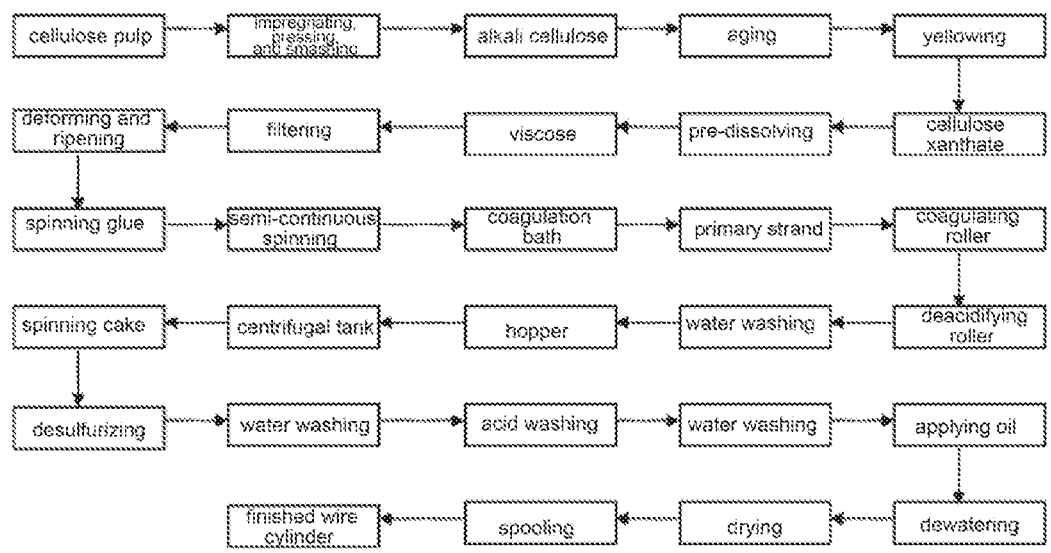

FUNCTIONAL REGENERATED VISCOSE FIBER

CROSS-REFERENCE TO RELATED APPLICATIONS

This application is a national stage application of PCT Application No. PCT/CN2016/105641, filed Nov. 14, 2016, which claims priority to Chinese Patent Application No. 201510817208.7, filed on Nov. 20, 2015; Chinese Patent Application No. 201510849113.3, filed on Nov. 26, 2015; and Chinese Patent Application No. 201510819312.X, filed on Nov. 20, 2015; the contents of which are incorporated hereby as a whole by reference.

TECHNICAL FIELD

The present disclosure relates to a regenerated cellulose fiber, and in particular to a functional regenerated cellulose fiber and its preparation method and application.

BACKGROUND

Regenerated cellulose fiber refers to a chemical fiber made from a natural polymer as a raw material by way of chemical process and is essentially identical to the original polymer in chemical compositions. At the same time, a regenerated fiber can also be made of cellulose as a raw material and has a structure of cellulose II.

The development of regenerated cellulose fibers can be generally divided into three stages, which form three generations of products. The first generation of product is the ordinary viscose fiber which came out in the early $20^{th}$ century to solve the shortage of cotton. The second generation of product is the high-wet-modulus viscose fiber for the industrial production began in the 1950s, and the main products include Toramomen developed by Japan (later named as Polynosic), the modified high-wet-modulus fiber HWM developed by United States, and the Modal fiber produced by Lenzing Company in the late 1980s using a new technology. Since the late 1960s, due to the rapid development of synthetic fiber production technology, abundant sources of raw materials and low cost, synthetic fibers have greatly impacted the market position of regenerated cellulose fibers. Many research institutions and companies have paid more attentions to the development and application of new synthetic fibers. The third-generation of product is represented by the short-fiber Tencel (TENCEL) and filament Newcell launched in the 1990s. Thanks to the awareness of health and environmental protection, nature-admiring and other factors, people have a new understanding of regenerated cellulose fibers, and the physical and chemical properties of the new generation of regenerated cellulose fibers have also been fully improved. Therefore, the application of regenerated cellulose fibers has reappeared rapid growth.

Among a large number of regenerated cellulose fibers, viscose fiber is a category of fiber which is more commonly used as textile fiber at present. Viscose fiber employs natural cellulose as a raw material, and is prepared by subjecting the natural cellulose to procedures such as alkalization, aging, and sulfonation, etc., to give soluble cellulose xanthate, which is then dissolved in a dilute alkali liquor to give viscose and then wet spinning; wherein, the viscose fiber employs natural cellulose such as cotton linter, corncob, wood or bamboo wood, etc. as raw materials, and is prepared by a series of treating processes such as cooking and bleaching, etc., to give dissolving pulp with much higher purity of cellulose, which is then subjected to procedures such as impregnation, pressing, smashing, aging, yellowing, dissolving, blending, filtering, defoaming, filtering, spinning, post-processing, drying, and packaging, etc.

Since the reduction of cultivated land and the depletion of petroleum resources, the output of natural fibers and synthetic fibers will be increasingly constrained. While people attach importance to the environmental protection performance in the textile consumption process, the value of regenerated cellulose fiber has also been re-understood and explored. Especially in recent years, regenerated cellulose fibers with different functions, i.e., functional regenerated cellulose fibers, further expand the scope and depth of regenerated cellulose fibers in textile applications, so that the application of regenerated cellulose fibers has acquired an unprecedented development opportunity.

Therefore, how to develop a regenerated cellulose fiber with multi-functionality has become the focus of attention and the problem to be solved in the field of textiles at present.

SUMMARY

In view of the above, the technical problem to be solved by the present disclosure is to provide a functional regenerated cellulose fiber and its preparation method and application. The functional regenerated cellulose fiber provided by the present disclosure, i.e., the functional viscose fiber, not only has a better far infrared property, but also can produce higher bacteria resistance and inhibition.

The present disclosure provides a functional regenerated cellulose fiber comprising a graphene structure and non-carbon non-oxygen elements; the non-carbon non-oxygen elements comprise elements of Fe, Si, and Al; and the elements of Fe, Si, and Al account for 0.018 wt % to 0.8 wt % of the regenerated cellulose fiber.

Preferably, the substance containing a graphene structure and non-carbon non-oxygen elements is introduced in a form of a carbon nanostructure-containing composite.

Preferably, the carbon nanostructure-containing composite comprises graphene, amorphous carbon and non-carbon non-oxygen elements; in the carbon nanostructure-containing composite, the non-carbon non-oxygen elements comprise elements of Fe, Si, and Al; and the content of the non-carbon non-oxygen elements is 0.5 wt % to 6 wt % of the carbon nanostructure-containing composite.

Preferably, the content of carbon element in the carbon nanostructure-containing composite is ≤80 wt %.

Preferably, the non-carbon non-oxygen elements account for 0.3 wt % to 5 wt %, preferably 1.5 wt % to 5 wt % of the carbon nanostructure-containing composite.

Preferably, the non-carbon non-oxygen elements are adsorbed on the surface or inside of the carbon nanostructure in a form of any one or more of elementary substance, oxide, or carbide.

As one alternative embodiment, the method for preparing the carbon nanostructure-containing composite includes the following steps:
(1) under the action of a catalyst, catalytically treating a biomass carbon source to obtain a precursor;
(2) under a condition of protective gas, maintaining the precursor at 140° C. to 180° C. for 1.5 to 2.5 hours to obtain a first intermediate;

(3) under a condition of protective gas, heating the first intermediate to 350° C. to 450° C. and maintaining at that temperature for 3 to 4 hours to obtain a second intermediate;
(4) under a condition of protective gas, heating the second intermediate to 1100° C. to 1300° C. and maintaining at that temperature for 2 to 4 hours to obtain a third intermediate; and
(5) subjecting the third intermediate to alkali washing, acid washing and water washing successively to obtain a composite; the heating rate in step (3) and (4) is 14° C./min to 18° C./min.

Preferably, the biomass carbon source is one or more of lignocellulose, cellulose and lignin.

As a second alternative embodiment, the method for preparing the carbon nanostructure-containing composite includes the following steps:
(1) mixing a biomass carbon source and a catalyst, stirring and catalyzing, then drying to obtain a precursor;
(2) under a protective atmosphere, maintaining the temperature of the precursor at 280 to 350° C. for 1.5 to 2.5 hours, then heating by temperature programming to 950 to 1200° C. at a heating rate of 15 to 20° C./min, maintaining that temperature for 3 to 4 hours to obtain a crude product; and
(3) washing the crude product to obtain a carbon nanostructure-containing composite.

In the second alternative embodiment, the biomass carbon source and the catalyst have a mass ratio of 1:0.1-10, preferably 1:0.5-5, further preferably 1:1-3; preferably, the catalyst is any one or a combination of at least two selected from the group consisting of manganese compounds, iron-containing compounds, cobalt-containing compounds, and nickel-containing compounds; preferably, the iron-containing compound is any one or a combination of at least two selected from the group consisting of halogen compounds of iron, iron cyanides and iron-containing salts of acid; preferably, the cobalt-containing compound is any one or a combination of at least two selected from the group consisting of halogen compounds of cobalt and cobalt-containing salts of acid; preferably, the nickel-containing compound is any one or a combination of at least two selected from the group consisting of nickel chlorides and nickel-containing salts of acid; preferably, the catalyst is any one or a combination of at least two selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate.

The stirring and catalyzing treatment is carried out at a temperature of 150 to 200° C. for ≤4 hours, preferably 4 to 14 hours; preferably, the water content in the precursor is 10 wt % or lower; preferably, the heating rate for heating the precursor to 280 to 350° C. is 3 to 5° C./min; preferably, the protective atmosphere is any one or a combination of at least two selected from the group consisting of nitrogen gas, helium gas and argon gas, preferably nitrogen gas; preferably, the crude product is subjected to acid washing and water washing successively; and the acid washing is preferably carried out by using hydrochloric acid with a concentration of 3 wt % to 6 wt %, further preferably hydrochloric acid with a concentration of 5 wt %; the water washing is preferably carried out by using deionized water and/or distilled water; preferably, the washing is carried out at a temperature of 55 to 65° C., preferably 60° C.

The biomass carbon source is cellulose and/or lignin, preferably cellulose, further preferably porous cellulose; preferably, the porous cellulose is obtained by the following method:
acid hydrolyzing a biomass source to obtain lignocellulose, then carrying out porous post-processing to obtain porous cellulose; optionally, the porous cellulose is used after bleaching; preferably, the biomass carbon source is any one or a combination of at least two selected from the group consisting of plants and/or agricultural and forestry wastes; preferably, any one or a combination of at least two selected from agricultural and forestry wastes; preferably, the agricultural and forestry wastes are any one or a combination of at least two selected from the group consisting of corn stalks, corn cobs, sorghum stalks, beet residues, bagasse, furfural residues, xylose residues, wood chips, cotton stalks, and reeds, preferably corn cobs.

As a third alternative embodiment, the method for preparing the carbon nanostructure-containing composite includes the following steps:
(1') acid hydrolyzing the corn cobs to obtain lignocellulose, then carrying out porous post-processing to obtain porous cellulose, bleaching the porous cellulose for ready use;
(1) mixing the porous cellulose of step (1') and catalyst in a mass ratio of 1:0.5 to 1.5, stirring at 150 to 200° C. to catalyze for 4 hours or more, then drying until the water content of the precursor is less than 10 wt % to obtain a precursor;
(2) under a protective atmosphere, heating the precursor to 280 to 350° C. at a heating rate of 3 to 5° C./min and maintaining that temperature for 2 hours, then heating by temperature programming to 950 to 1050° C. at a heating rate of 15 to 20° C./min and maintaining that temperature for 3 to 4 hours to obtain a crude product; and
(3) at a temperature of 55 to 65° C., subjecting the crude product to acid washing with hydrochloric acid having a concentration of 5 wt %, then water washing to obtain a carbon nanostructure-containing composite.

The carbon nanostructure-containing composite prepared by the above methods also belong to the case containing biomass graphene.

For the carbon nanostructure-containing composite, a typical but non-limiting example may be any one or a combination of at least two of substance 1, substance 2, substance 3, or substance 4 having properties described in Table A:

TABLE A

| Items | Performance indicators | | | |
| --- | --- | --- | --- | --- |
| | Substance 1 | Substance 2 | Substance 3 | Substance 4 |
| Conductivity, S/m | 2800-8000 | 5000-8000 | 2800-4000 | 3000-8000 |
| Specific surface area, $m^2/g$ | ≤150 | ≤150 | ≤300 | ≤250 |
| Raman spectrum, IG/ID | ≤2.0 | ≤3.0 | ≤2.0 | ≤2.0 |
| C/O | ≤35.0 | ≤40.0 | ≤35.0 | ≤40.0 |
| Ash, % | 1.0-4.0 | 2.0-4.0 | 1.0-2.5 | 1.0-2.0 |
| Fe, % | 0.1-0.5 | 0.1-0.5 | 0.1-0.5 | 0.1-0.5 |
| Si, % | 0.05-0.3 | 0.05-0.3 | 0.05-0.3 | 0.05-0.3 |
| Al, % | 0.05-0.4 | 0.05-0.4 | 0.05-0.4 | 0.05-0.4 |

In Table A, IG/ID is the peak height ratio of G peak to D peak in the Raman spectrum.

The carbon nanostructure-containing composite of the present disclosure has a peak height ratio of the G peak to D peak of preferably ≤2.0, further preferably ≤3.0, and particularly preferably ≤5.0. Optionally, the carbon nanostructure-containing composite of the present disclosure has a peak height ratio of the G peak to D peak of ≥30, for example, 27, 25, 20, 18, 15, 12, 10, 8, and 7, etc.

Those skilled in the art should understand that the performance indicators of the carbon nanostructure-containing composite listed in Table A all refer to the indicators of the powder of the carbon nanostructure-containing composite. If the carbon nanostructure-containing composite is a slurry, the above indicators are the indicators of the powder before preparing the slurry.

When the carbon nanostructure-containing composite is powder, the carbon nanostructure-containing composite powder has the following properties in addition to the performance indicators described in Table A:
black powder, uniform fineness, without obvious large particles, water content ≥3.0%, particle size D90≥10.0 μm, pH 5.0 to 8.0, and apparent density of 0.2 to 0.4 g/cm$^3$.

When the carbon nanostructure-containing composite is a slurry, it is a product obtained by dispersing carbon nanostructure-containing composite in a solvent, and the carbon nanostructure-containing composite slurry has the following properties in addition to the performance indicators described in Table A:
solid content of 1.0-10.0%, particle size D50≥0.7 um, pH 8.0 to 10.0, Zeta potential ≥−10 mV, and viscosity of 5.0 to 8.0 mpa·s.

Preferably, the carbon nanostructure-containing composite accounts for 0.1 wt % to 10 wt % of the functional regenerated cellulose fiber.

Preferably, the graphene structure has a thickness of less than or equal to 100 nm.

Preferably, the graphene structure is one or a combination of more of carbon six-membered ring honeycomb lamellar structures having 1-10 layers.

Preferably, the elements of Fe, Si, and Al account for 0.1 wt % to 0.7 wt % of the regenerated cellulose fiber.

Preferably, the non-carbon non-oxygen elements account for 0.03 wt % to 1 wt % of the regenerated cellulose fiber.

Preferably, the graphene structure has a thickness of less than or equal to 100 nm.

Preferably, the graphene structure is one or a combination of more of carbon six-membered ring honeycomb lamellar structures having 1-10 layers.

Preferably, the non-carbon non-oxygen element further comprises one or more of P, Ca, Na, Ni, Mn, K, Mg, Cr, S and Co.

Preferably, the non-carbon non-oxygen elements account for 0.1 wt % to 1 wt % of the regenerated cellulose fiber.

The present disclosure also provides a method for preparing a functional regenerated cellulose fiber comprising the following steps: pulp impregnation, pressing, smashing, aging, yellowing, dissolving, ripening, filtering and defoaming steps; the graphene structure and the non-carbon non-oxygen elements are introduced during the steps after the yellowing step.

Preferably, the graphene structure and the non-carbon non-oxygen elements are introduced in a form of a carbon nanostructure-containing composite.

The present disclosure also provides a method for preparing a functional regenerated cellulose fiber comprising the following steps: dissolving the cellulose pulp with the NMMO (N-methylmorpholine-N-oxide) solution, introducing a substance containing a graphene structure and non-carbon non-oxygen elements to obtain a spinning dope and preparing regenerated cellulose fiber using the spinning dope.

Preferably, the substance containing a graphene structure and non-carbon non-oxygen elements comprises a carbon nanostructure-containing composite.

The present disclosure also provides an article comprising the functional regenerated cellulose fiber as described above or the regenerated cellulose fiber prepared by the method as described above.

The article includes civilian clothing, home textiles, ultraviolet protective fabrics or special protective clothing for industry use.

Preferably, the home textiles include a towel, a bath towel, a bed sheet, and a quilt cover.

Compared with the existing technology, the present disclosure has the following beneficial effects:

Compared with the existing technology, by means of the functional regenerated cellulose fiber provided by the present disclosure, a substance containing a graphene structure and non-carbon non-oxygen elements is introduced in the traditional regenerated cellulose fiber. Through matching and combining of the graphene structure and elements of Fe, Si, and Al, the regenerated cellulose fiber provided by the present disclosure can have various properties of far infrared property and bacteria resistance and inhibition; and by controlling a specific adding proportion, the regenerated cellulose fiber provided by the present disclosure can have a higher far infrared effect and bacteria inhibition effect. Experimental results show that the far infrared property of the regenerated cellulose fiber provided by the present disclosure can reach a maximum of 0.93; and the bacteria inhibition property can reach a maximum of 99%.

BRIEF DESCRIPTION OF DRAWINGS

FIG. 1 is a process flow chart of filaments of viscose fiber.

DESCRIPTION

In order to further understand the present disclosure, preferred embodiments are described below in combination with the following examples. It should be understood that these descriptions are merely used for further illustrating the features and advantages of the present disclosure instead of limiting the claims of the present disclosure.

There is no particular restriction to the sources of all the raw materials in the present disclosure, as long as they are commercially available or prepared according to conventional methods well known by those skilled in the art.

There is no particular restriction to the purities of all the raw materials in the present disclosure, and analytical purity is preferably used in the present disclosure.

The present disclosure provides a functional regenerated cellulose fiber comprising a graphene structure and non-carbon non-oxygen elements; the non-carbon non-oxygen elements comprise elements of Fe, Si, and Al; and the elements of Fe, Si, and Al account for 0.018 wt % to 1 wt % of the regenerated cellulose fiber. The elements of Fe, Si and Al described in the present disclosure preferably account for 0.018 wt % to 0.8 wt %, more preferably 0.1 wt % to 0.7 wt %, more preferably 0.2 wt % to 0.7 wt %, and most preferably 0.3 wt % to 0.5 wt % of the regenerated cellulose fiber, and can be 0.05 wt %, 0.1 wt %, 0.2 wt %, 0.3 wt %, 0.45 wt %, 0.7 wt %, 0.72 wt %, and 0.78 wt %, etc. The mass fraction of the non-carbon non-oxygen non-hydrogen element in the regenerated cellulose fiber mentioned above in the present disclosure refers to the content of the non-carbon non-oxygen non-hydrogen element in the regenerated cellulose fiber, i.e., the content of the element in the fiber. Preferably, the content which is introduced due to process condition in later spinning process for example coating fiber filament with silicone oil, is excluded.

The non-carbon non-oxygen elements account for 0.03 wt % to 1 wt % of the regenerated cellulose fiber. The non-carbon non-oxygen elements described in the present disclosure preferably account for 0.03 wt % to 1 wt %, more preferably 0.1 wt % to 0.8 wt %, more preferably 0.2 wt % to 0.7 wt %, and most preferably 0.3 wt % to 0.5 wt % of the regenerated cellulose fiber, and can be 0.05 wt %, 0.1 wt %, 0.2 wt %, 0.3 wt %, 0.45 wt %, 0.7 wt %, 0.82 wt %, and 0.93 wt %, etc. The mass fraction of the non-carbon non-oxygen elements in the regenerated cellulose fiber mentioned above in the present disclosure refers to the content of the non-carbon non-oxygen elements in the regenerated cellulose fiber, i.e., the content of the elements in the mixture.

The non-carbon non-oxygen elements of the present disclosure preferably include non-carbon non-oxygen non-hydrogen elements, and the non-carbon non-oxygen elements described in the present disclosure especially refer to mineral elements. The non-carbon non-oxygen elements are mentioned in order to add the reference basis. It is well known to those skilled in the art that a certain amount of hydrogen element is contained in the regenerated cellulose fiber, and the proportion of the non-carbon non-oxygen elements in the regenerated cellulose fiber is not limited to 0.03 wt % to 1 wt % and can be suitably magnified, for example magnified to 0.03 to 5 wt %.

There is no particular restriction to the graphene structure in the present disclosure, as long as it has a definition well-known by a person skilled in the art. The graphene structure in the present disclosure refers to a combination of multiple structures including a single-layer graphene structure or a multi-layer graphene structure, more preferably a combination of a single-layer graphene and a graphene with different layers; the graphene structure of the present disclosure is more preferably any one or a combination of more of carbon six-membered ring honeycomb lamellar structures having 1-10 layers, and more preferably any one or a combination of more of single layer structure, double layers structure or 3-10 layers structures. Generally, carbon six-membered ring honeycomb lamellar structures having more than 10 layers and a thickness of 100 nm or less are called graphene nanosheets; carbon six-membered ring honeycomb lamellar structures having more than 10 layers and a thickness of 100 nm or less and prepared by using biomass as carbon source are called biomass graphene nanosheets; carbon six-membered ring honeycomb lamellar structures having 1-10 layers are called graphene; and carbon six-membered ring honeycomb lamellar structures having 1-10 layers and prepared by using biomass as carbon source are called biomass graphene.

The graphene structure of the present disclosure preferably has the following microscopic appearance: the carbon six-membered ring honeycomb lamellar structure shows any one or a combination of more of conformations selected from the group consisting of warping, curling and folding on a microscopic level. The micromorphology of the lamellar structure in the composite typically can be observed via electron microscope which may be transmission electron microscope or scanning electron microscope. The graphene structure of the present disclosure preferably has a thickness of less than or equal to 100 nm, more preferably less than or equal to 50 nm, and most preferably less than or equal to 20 nm.

In the functional regenerated cellulose fiber of the present disclosure, the non-carbon non-oxygen elements preferably further comprise one or more selected from the group consisting of P, Ca, Na, Ni, Mn, K, Mg, Cr, S and Co, more preferably more selected therefrom. The non-carbon non-oxygen elements exist in a form of any one or a combination of more of elementary substances and compounds. In the above preferred embodiments, the ratio of non-carbon non-oxygen element accounting for the regenerated cellulose fiber, i.e. the content of the non-carbon non-oxygen elements in the regenerated cellulose fiber, is preferably 0.1 wt % to 1 wt %, more preferably 0.2 wt % to 0.8 wt %, more preferably 0.3 wt % to 0.7 wt %, and most preferably 0.4 wt % to 0.5 wt %.

By way of example, the non-carbon non-oxygen elements in the regenerated cellulose fiber of the present disclosure comprise a combination of P, Ca and Na; a combination of Ni, Mn, K and Co; a combination of Mg, Cr, S and Mn; a combination of P, Ca, Na, Ni, Mn, K and Cr; a combination of P, Ca, Na, Ni, Mn, K, Mg, Cr, S and Co, etc. The content of the non-carbon non-oxygen elements in the regenerated cellulose fiber may be, for example, 0.21 wt %, 0.24 wt %, 0.27 wt %, 0.29 wt %, 0.33 wt %, 0.36 wt %, 0.38 wt %, 0.45 wt %, and 0.48 wt %, etc.

There is no particular restriction to how the graphene structure and the substance containing non-carbon non-oxygen elements are introduced into the regenerated cellulose fiber in the present disclosure, as long as they are introduced by a method well known by those skilled in the art. According to the present disclosure, in order to improve the performance of the functional regenerated cellulose fiber, it is preferable that the graphene structure and the substance containing non-carbon non-oxygen elements are introduced in the form of a carbon nanostructure-containing composite. The substance containing non-carbon non-oxygen elements in the present disclosure is preferably nanoscale materials of the above elements, more preferably one or more selected from the group consisting of nanoscale elementary substances, nanoscale oxides and nanoscale inorganic compounds.

The mass of the carbon nanostructure-containing composite of the present disclosure accounts for preferably 0.1 wt % to 10 wt %, more preferably 1 wt % to 8 wt %, most preferably 3 wt % to 5 wt % of that of the regenerated cellulose fiber. In the carbon nanostructure-containing composite, the content of carbon is preferably great than or equal to 80 wt %, more preferably 85 wt % to 97 wt %, most preferably 90 wt % to 95 wt %. In the carbon nanostructure-containing composite, the content of the non-carbon non-oxygen element is preferably 0.5 wt % to 6 wt %, more preferably 1 wt % to 5 wt %, most preferably 2 wt % to 4 wt %. The carbon nanostructure-containing composite has a peak height ratio of G peak to D peak of 1 to 20, more preferably 3 to 20 in the Raman spectrum.

In the carbon nanostructure-containing composite of the present disclosure, the graphene structure preferably has a carbon six-membered ring honeycomb lamellar structure having a thickness of 100 nm or less, preferably a carbon six-membered ring honeycomb lamellar structure having a thickness of 20 nm or less, further preferably any one or a combination of at least two of carbon six-membered ring honeycomb lamellar structures having 1-10 layers, preferably any one or a combination of at least two of single layer structure, double layers structure or 3-10 layers structures; preferably, the carbon six-membered ring honeycomb lamellar structure in the composite shows any one or a combination of at least two of conformations selected from the group consisting of warping, curling and folding on a microscopic level.

The carbon nanostructure-containing composite of the present disclosure preferably comprises a graphene structure and amorphous carbon; the non-carbon non-oxygen elements are adsorbed on the surface or inside of carbon nanostructure in a form of any one or a combination of more of elementary substance, oxide, and carbide. The amorphous carbon al so comprises two-dimensional graphite layers or three-dimensional graphite crystallites, on the edge of which there are a large number of irregular bonds, and further comprises many sp3 carbons besides a large number of sp2 carbons. In fact, their interior structures are crystals having the same structure as graphite, rather than real amorphous body, besides that the layered structure formed by the hexagonal annular plane of carbon atoms is messy and irregular and there are defects in the formed crystal; the majority of amorphous carbon is formed by molecular debris having graphite layer structure which are roughly parallel to each other, and irregularly stacked together, referred to as chaotic layer structure. The layers or debris is connected by carbon atom bonds in the form of tetrahedral bonding of diamond structure.

Preferably, during the process of preparing the modified regenerated cellulose fiber, the substance for introducing graphene structure is not activated or modified during the introduction of graphene structure.

There is no particular restriction to the method for preparing the carbon nanostructure-containing composite in the present disclosure.

Preferably, the carbon nanostructure-containing composite contains graphene, amorphous carbon and non-carbon non-oxygen elements; in the carbon nanostructure-containing composite, the non-carbon non-oxygen elements include elements of Fe, Si and Al; the content of the non-carbon non-oxygen element is 0.5 wt % to 6 wt % of the carbon nanostructure-containing composite.

The content of carbon in the carbon nanostructure-containing composite is preferably ≤80 wt %, for example 82 wt %, 86 wt %, 89 wt %, 91 wt %, 94 wt %, 97 wt %, 99 wt %, etc., preferably 85 wt % to 97 wt %, more preferably 90 wt % to 95 wt %.

Preferably, the non-carbon non-oxygen elements account for 0.3 wt % to 5 wt %, preferably 0.5 wt % to 5 wt %, more preferably 1.5 wt % to 5 wt % of the carbon nanostructure-containing composite. In certain embodiments of the present disclosure, the non-carbon non-oxygen elements account for 0.7 wt %, 1.1 wt %, 1.3 wt %, 1.6 wt %, 2 wt %, 2.8 wt %, 3.5 wt %, 4.2 wt %, 5.3 wt % or 5.8 wt % of the carbon nanostructure-containing composite.

Preferably, the non-carbon non-oxygen elements are adsorbed on the surface or inside of the carbon nanostructure in a form of any one or more of elementary substance, oxide, or carbide.

There is no particular restriction to the method for preparing the carbon nanostructure-containing composite in the present disclosure, the method for preparing similar composites well-known to those skilled in the art can be used.

As one alternative embodiment, a Method 1 for preparing the carbon nanostructure-containing composite includes the following steps:

(1) under the action of a catalyst, catalytically treating a biomass carbon source to obtain a precursor;

(2) under a condition of protective gas, maintaining the precursor at 140° C. to 180° C. for 1.5 to 2.5 hours to obtain a first intermediate;

(3) under a condition of protective gas, heating the first intermediate to 350° C. to 450° C. and maintaining at that temperature for 3 to 4 hours to obtain a second intermediate;

(4) under a condition of protective gas, heating the second intermediate to 1100° C. to 1300° C. and maintaining at that temperature for 2 to 4 hours to obtain a third intermediate; and (5) subjecting the third intermediate to alkali washing, acid washing and water washing successively to obtain a composite; the heating rate in step (3) and (4) is 14° C./min to 18° C./min.

The carbon source is preferably biomass carbon source, and the biomass carbon source is any one or a combination of at least two selected from the group consisting of plants and/or agricultural and forestry wastes; preferably, any one or a combination of at least two of needlebush, broadleaf wood, forestry wood, and agricultural and forestry wastes; preferably, the agricultural and forestry wastes are any one or a combination of at least two selected from the group consisting of corn stalks, corn cobs, sorghum stalks, beet residues, bagasse, furfural residues, xylose residues, wood chips, cotton stalks, fruit shell, and reeds, preferably corn cobs. The biomass carbon source is preferably lignocellulose, cellulose and/or lignin, more preferably cellulose and/or lignin, more preferably cellulose, and further preferably porous cellulose.

Preferably, during the process of preparing the regenerated cellulose fiber, the substance for introducing graphene structure is not activated or modified during the introduction of graphene structure.

The biomass carbon source and the catalyst have a mass ratio of 1:0.1-10, for example 1:0.2, 1:0.5, 1:0.8, 1:1.1, 1:1.5, 1:2, 1:3, 1:4, 1:5, 1:6, 1:7, 1:8, and 1:9, etc., preferably, 1:0.5-5, more preferably 1:1-3.

Preferably, the catalyst is any one or a combination of at least two selected from the group consisting of manganese compounds, iron-containing compounds, cobalt-containing compounds, and nickel-containing compounds; the iron-containing compound is any one or a combination of at least two selected from the group consisting of halogen compounds of iron, iron cyanides and iron-containing salts of acid; the cobalt-containing compound is any one or a combination of at least two selected from the group consisting of halogen compounds of cobalt and cobalt-containing salts of acid; the nickel-containing compound is any one or a combination of at least two selected from the group consisting of nickel chlorides and nickel-containing salts of acid; further preferably, the catalyst is any one or a combination of at least two selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate. By way of example, the catalyst is selected from the group consisting of a combination of ferric chloride and ferric nitrate; a combination of ferrous nitrate, ferric sulfate and cobalt chloride; a combination of cobalt acetate, nickel chloride and nickel sulfate; a combination of potassium ferricyanide, potassium ferrocyanide, potassium trioxalatoferrate and ferrous nitrate; and a combination of cobalt chloride, cobalt nitrate, cobalt sulfate and cobalt acetate, etc.

Preferably, the stirring and catalyzing treatment in step (1) is carried out at a temperature of 150 to 200° C. for ≤4 hours, preferably 4 to 14 hours; the water content in the precursor is preferably 10 wt % or lower; the heating rate for heating the precursor to 280 to 350° C. is preferably 3 to 5° C./min in step (2); the protective atmosphere is any one or a combination of at least two selected from the group consisting of nitrogen gas, helium gas and argon gas, preferably nitrogen gas; the crude product is subjected to acid washing and water washing successively in step (3); and the acid washing is preferably carried out by using hydrochloric acid with a concentration of 3 wt % to 6 wt %, further preferably hydrochloric acid with a concentration of 5 wt %; the water washing is preferably carried out by using deionized water and/or distilled water; the washing is carried out at a temperature of 55 to 65° C., preferably 60° C.

Preferably, the above preparation steps of the present disclosure can also specifically be:

firstly, mixing a biomass carbon source and a catalyst, stirring and catalyzing, then drying to obtain a precursor;

then maintaining the precursor at a temperature of 140 to 180° C. for 1.5 to 2.5 hours under a protective atmosphere to obtain a first intermediate; in certain specific embodiments of the present disclosure, the temperature is 142° C., 148° C., 155° C., 1600° C., 172° C. or 178° C.; and the time for maintaining the temperature is 1.6 hours, 1.8 hours, 2 hours, 2.2 hours or 2.4 hours;

then heating by temperature programming to 350 to 450° C. and maintaining the temperature for 3 to 4 hours to obtain a second intermediate; in certain specific embodiments of the present disclosure, the temperature is 360° C., 370° C., 380° C., 390° C., 410° C., 420° C., 430° C. or 440° C.; and the time for maintaining the temperature is 3.1 hours, 3.3 hours, 3.5 hours, 3.8 hours or 3.9 hours;

then heating to 1100 to 1300° C. and maintaining the temperature for 2 to 4 hours to obtain a third intermediate, i.e. a crude product; in certain specific embodiments of the present disclosure, the temperature is 1130° C., 1170° C., 1210° C. or 1280° C.; and the time for maintaining the temperature is 2.2 hours, 2.4 hours, 2.6 hours, 2.8 hours, 3.0 hours, 3.2 hours, 3.4 hours, 3.6 hours or 3.8 hours;

the heating rate of the temperature programming is 14° C./min to 18° C./min; in certain specific embodiments of the present disclosure, the heating rate is 15° C./min, 16° C./min or 17° C./min; and finally alkali washing, acid washing and water washing the third intermediate (i.e. the crude product) to obtain a composite.

In the present disclosure, the biomass carbon source is preferably one or more selected from lignocellulose, cellulose and lignin, more preferably lignocellulose, cellulose or lignin.

In the present disclosure, the biomass carbon source and catalyst have a mass ratio of 1:(0.5-5), preferably 1:(1-3); in certain specific embodiments of the present disclosure, the ratio is 1:0.5, 1:1 or 1:3.

In the present disclosure, the catalyst is any one or a combination of at least two selected from the group consisting of halogen compounds of manganese, iron-containing compounds, cobalt-containing compounds, and nickel-containing compounds.

Preferably, the iron-containing compound is any one or a combination of at least two selected from the group consisting of halogen compounds of iron, iron cyanides and iron-containing salts of acid. The iron-containing salts of acid are organic acid salts containing iron element or inorganic acid salts containing iron element. The halogen compounds of iron may be ferric chloride and/or ferric bromide.

Preferably, the cobalt-containing compound is any one or a combination of at least two selected from the group consisting of halogen compounds of cobalt and cobalt-containing salts of acid. The cobalt-containing salts of acid are organic acid salts containing cobalt element or inorganic acid salts containing cobalt element. The halogen compounds of cobalt may be cobalt chloride and/or cobalt bromide.

Preferably, the nickel-containing compound is any one or a combination of at least two selected from the group consisting of nickel chlorides and nickel-containing salts of acid. The nickel-containing salts of acid are organic acid salts containing nickel element or inorganic acid salts containing nickel element. The halogen compounds of nickel may be nickel chloride and/or nickel bromide.

Preferably, the catalyst is any one or a combination of at least two selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate.

Typical but non-limiting examples of the combination of the catalyst of the present disclosure include a combination of ferrous chloride and ferric sulfate; a combination of potassium ferricyanide and potassium trioxalatoferrate; a combination of cobalt chloride, cobalt nitrate and ferric chloride; a combination of cobalt sulfate, cobalt acetate and nickel nitrate; and a combination of ferric chloride, cobalt chloride, and nickel acetate.

The stirring and catalyzing treatment is carried out at a temperature of 150° C. to 200° C., for example, 160° C., 170° C., 180° C., and 190° C., etc., and lasts for ≤4 hours, preferably 4 hours to 14 hours. In certain specific embodiments of the present disclosure, it lasts for 4.2 hours, 7 hours, 9 hours, 12 hours, 16 hours, 19 hours, and 23 hours.

Preferably, the water content in the precursor is 10 wt % or less. In certain specific embodiments of the present disclosure, the water content is 1 wt %, 2 wt %, 3 wt %, 4 wt %, 5 wt %, 6 wt %, 7 wt %, 8 wt %, and 10 wt %, etc.

Preferably, the protective atmosphere is any one or a combination of at least two selected from the group consisting of nitrogen gas, helium gas and argon gas, preferably nitrogen gas.

Preferably, the acid washing is carried out by using an aqueous hydrochloric acid solution with a concentration of 3 wt % to 6 wt %, further preferably an aqueous hydrochloric acid solution with a concentration of 5 wt %; the water washing is preferably carried out by using deionized water and/or distilled water; the alkali washing is carried out by using an aqueous sodium hydroxide solution with a concentration of 5 wt % to 15 wt %, further preferably an aqueous sodium hydroxide solution with a concentration of 10 wt %.

Preferably, the washing is carried out at a temperature of 55 to 65° C., for example, 56° C., 57° C., 58° C., 60° C., and 63° C., etc., preferably 60° C.

The biomass carbon source is cellulose and/or lignin, preferably cellulose, further preferably porous cellulose.

The porous cellulose of the present disclosure can be obtained according to the existing technology. Typical but non-limiting existing technology for obtaining porous cellulose include, for example, the method for preparing porous cellulose disclosed in CN104016341A, and the method for preparing cellulose disclosed in CN103898782A.

Preferably, the porous cellulose is obtained by the following method:
acid hydrolyzing a biomass source to obtain lignocellulose, then carrying out porous post-processing to obtain porous cellulose; optionally, the porous cellulose is used after bleaching.

The biomass carbon source is any one or a combination of at least two selected from the group consisting of plants and/or agricultural and forestry wastes; preferably, any one or a combination of at least two selected from the group consisting of agricultural and forestry wastes.

Preferably, the agricultural and forestry wastes are any one or a combination of at least two selected from the group consisting of corn stalks, corn cobs, sorghum stalks, beet residues, bagasse, furfural residues, xylose residues, wood chips, cotton stalks, and reeds, preferably corn cobs.

Typical but non-limiting combinations of the biomass source of the present disclosure include a combination of corn stalks and corn cobs; a combination of bagasse, sorghum stalks and wood chips; a combination of beet residues, bagasse and corn cobs; and a combination of sorghum stalks, beet residues and xylose residues, etc.

The carbon nanostructure-containing composite of the present disclosure can also be prepared by the following various methods.

As a second alternative embodiment, a Method 2 for preparing the carbon nanostructure-containing composite includes the following steps:
(1) mixing a biomass carbon source and a catalyst, stirring and catalyzing, then drying to obtain a precursor;
(2) under a protective atmosphere, maintaining the precursor at a temperature of 280 to 350° C. for 1.5 to 2.5 hours, then heating by temperature programming to 950 to 1200° C. at a heating rate of 15 to 20° C./min, maintaining that temperature for 3 to 4 hours to obtain a crude product; and
(3) washing the crude product to obtain a carbon nanostructure-containing composite.

In the second alternative embodiment, the biomass carbon source and the catalyst have a mass ratio of 1:0.1-10, preferably 1:0.5-5, further preferably 1:1-3; preferably, the catalyst is any one or a combination of at least two selected from the group consisting of manganese compounds, iron-containing compounds, cobalt-containing compounds, and nickel-containing compounds; preferably, the iron-containing compound is any one or a combination of at least two selected from the group consisting of halogen compounds of iron, iron cyanides and iron-containing salts of acid; preferably, the cobalt-containing compound is any one or a combination of at least two selected from the group consisting of halogen compounds of cobalt and cobalt-containing salts of acid; preferably, the nickel-containing compound is any one or a combination of at least two selected from the group consisting of nickel chlorides and nickel-containing salts of acid; preferably, the catalyst is any one or a combination of at least two selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate.

The stirring and catalyzing treatment is carried out at a temperature of 150 to 200° C. for ≤4 hours, preferably 4 to 14 hours; preferably, the water content in the precursor is 10 wt % or lower; preferably, the precursor is heated to 280 to 350° C. at a heating rate of 3 to 5° C./min; preferably, the protective atmosphere is any one or a combination of at least two selected from the group consisting of nitrogen gas, helium gas and argon gas, preferably nitrogen gas; preferably, the crude product is subjected to acid washing and water washing successively; and the acid washing is preferably carried out by using hydrochloric acid with a concentration of 3 wt % to 6 wt %, further preferably hydrochloric acid with a concentration of 5 wt %; the water washing is preferably carried out by using deionized water and/or distilled water; preferably, the washing is carried out at a temperature of 55 to 65° C., preferably 60° C.

The biomass carbon source is cellulose and/or lignin, preferably cellulose, further preferably porous cellulose; preferably, the porous cellulose is obtained by the following method:
acid hydrolyzing a biomass source to obtain lignocellulose, then carrying out porous post-processing to obtain porous cellulose; optionally, the porous cellulose is used after bleaching;
preferably, the biomass carbon source is any one or a combination of at least two selected from the group consisting of plants and/or agricultural and forestry wastes; preferably, any one or a combination of at least two selected from agricultural and forestry wastes; preferably, the agricultural and forestry wastes are any one or a combination of at least two selected from the group consisting of corn stalks, corn cobs, sorghum stalks, beet residues, bagasse, furfural residues, xylose residues, wood chips, cotton stalks, and reeds, preferably corn cobs.

As a third alternative embodiment, a Method 3 for preparing the carbon nanostructure-containing composite includes the following steps:
(1') acid hydrolyzing corn cobs to obtain lignocellulose, then carrying out porous post-processing to obtain porous cellulose, bleaching the porous cellulose for ready use;
(1) mixing the porous cellulose of step (1') and catalyst in a mass ratio of 1:0.5-1.5, stirring at 150 to 200° C. to catalyze for 4 hours or more, then drying until the water content of the precursor is less than 10 wt % to obtain a precursor;
(2) under a protective atmosphere, heating the precursor to 280 to 350° C. at a heating rate of 3 to 5° C./min and maintaining that temperature for 2 hours, then heating by temperature programming to 950 to 1050° C. at a heating rate of 15 to 20° C./min and maintaining that temperature for 3 to 4 hours to obtain a crude product; and
(3) at a temperature of 55 to 65° C., subjecting the crude product to acid washing with hydrochloric acid having a concentration of 5 wt %, then water washing to obtain a carbon nanostructure-containing composite.

The carbon nanostructure-containing composites prepared by the above methods (Method 1, 2 and 3) also belong to the case containing biomass graphene.

The carbon nanostructure-containing composites prepared by the above preparation methods also belong to the case containing biomass graphene.

The carbon nanostructure-containing composite of the present disclosure can also be prepared by the following various methods.

Method 4: Biomass source is used to obtain active carbon via current processes. Since the types and contents of microelements within different plants are greatly different, later steps such as acid washing and water washing are used to control the content of the non-carbon non-oxygen element. Graphene is introduced on such a basis to make non-carbon non-oxygen element account for 0.5 wt % to 6 wt % of the composite.

Method 5: Commercially available lignin is carbonized at high-temperature under inert gas, or subjected to incomplete graphitization reaction. Then graphene is added. A combination of any three or more elements selected from the group consisting of nano-P, Si, Ca, Al, Na, Fe, Ni, Mn, K, Mg, Cr, S or Co is introduced at a later stage, and the content thereof is controlled to be 0.5 wt % to 6 wt %.

Method 6: Some organic wastes such as phenolic resin cystosepiment are carbonized, then graphene is introduced. A combination of any three or more elements selected from the group consisting of nano-P, Si, Ca, Al, Na, Fe, Ni, Mn, K, Mg, Cr, S or Co is introduced at a later stage, and the content thereof is controlled to be 0.5 wt % to 6 wt %.

Method 7: Active carbon and graphene are added into nano-graphite. A combination of any three or more elements selected from the group consisting of nano-P, Si, Ca, Al, Na, Fe, Ni, Mn, K, Mg, Cr, S or Co is introduced at a later stage, and the content thereof is controlled to be 0.5 wt % to 6 wt %.

The preparation of carbon nanostructure-containing composite claimed in the present disclosure is not limited to these method described above. For the products of the carbon nanostructure-containing composite claimed in the present disclosure obtained by the method described above, the far infrared and bacteria resistance of the products obtained by Methods 1 to 3 are superior to those obtained by Methods 4 to 7. However, homogeneous dispersion in the functional regenerated cellulose fiber and a certain effect can be achieved without any activation or modification to the carbon nanostructure-containing composite when downstream products are prepared, especially for Methods 1 to 3.

The graphene structure and a substance containing non-carbon non-oxygen elements are introduced in the form of a carbon nanostructure-containing composite in the present disclosure, and in the process of introduction, effective combination with the regenerated cellulose and additionally enhanced far infrared effect and bacteria inhibition effect can be achieved without the necessary of carrying out the pretreatment of the substances such as activation, and modification, etc.

A first method for determining the content of non-carbon non-oxygen element is:

decomposing the carbon nanostructure-containing composite with nitric acid (p=1.42 g/mL), perchloric acid (p=1.67 g/mL) and hydrofluoric acid (p=1.16 g/mL), maintaining the temperature in nitric acid medium, determining the volume, then quantitatively analyzing the content of elements P, Si, Ca, Al, and Na, etc., in the carbon nanostructure-containing composite with inductively coupled plasma atomic emission spectrometer using standard curve method.

A second method for determining the content of non-carbon non-oxygen element is:

Using the National Standard GB/T17359-1998: General specification of X-ray energy spectra quantitative analysis for electronic probe and scanning electron microscope.

There is no restriction to the method for determining non-carbon non-oxygen element in the present disclosure, and any of the methods known in the art or new determining method can be used in the present disclosure. The present disclosure provides two methods for determining the content of non-carbon non-oxygen element, preferably "first method for determining the content of non-carbon non-oxygen element" is used. "first method for determining the content of non-carbon non-oxygen element" is used in the examples of the present disclosure.

Infrared detection data of the carbon nanostructure-containing composite are based on GBT 7286.1-1987 "Test method for total normal emittance of metals and nonmetallic materials".

Bacteria inhibition test data of the carbon nanostructure-containing composite are based on the test method according to GB/T 20944.3-2008, taking *Staphylococcus aureus* as an example.

The present disclosure provides a method for preparing a functional regenerated cellulose fiber comprising the following steps: pulp impregnation, pressing, smashing, aging, yellowing, dissolving, ripening, filtering and defoaming steps; the substance containing a graphene structure and non-carbon non-oxygen elements is introduced during the steps after the yellowing step.

The graphene structure of the present disclosure is preferably introduced in a form of a mixture, which preferably comprises a non-graphene-structure component, such as amorphous carbon component. Preferably, the graphene structure and the non-carbon non-oxygen element are introduced in a form of a carbon nanostructure-containing composite.

The substance containing a graphene structure and non-carbon non-oxygen elements is more preferably introduced during the dissolving step, and more preferably it is dispersed in advance in dilute alkali liquor for dissolving the cellulose xanthate.

For the carbon nanostructure-containing composite, a typical but non-limiting example may be any one or a combination of at least two of substance 1, substance 2, substance 3 or substance 4 having properties described in Table A:

TABLE A

| | Performance indicators | | | |
|---|---|---|---|---|
| Items | Substance 1 | Substance 2 | Substance 3 | Substance 4 |
| Conductivity, S/m | 2800-8000 | 5000-8000 | 2800-4000 | 3000-8000 |
| Specific surface area, m$^2$/g | ≤150 | ≤150 | ≤300 | ≤250 |
| Raman spectrum, IG/ID | ≤2.0 | ≤3.0 | ≤2.0 | ≤2.0 |
| C/O | ≤35.0 | ≤40.0 | ≤35.0 | ≤40.0 |
| Ash, % | 1.0-4.0 | 2.0-4.0 | 1.0-2.5 | 1.0-2.0 |
| Fe, % | 0.1-0.5 | 0.1-0.5 | 0.1-0.5 | 0.1-0.5 |
| Si, % | 0.05-0.3 | 0.05-0.3 | 0.05-0.3 | 0.05-0.3 |
| Al, % | 0.05-0.4 | 0.05-0.4 | 0.05-0.4 | 0.05-0.4 |

In Table A, IG/ID is the peak height ratio of G peak to D peak in the Raman spectrum.

Those skilled in the art should understand that the performance indicators of the carbon nanostructure-containing composite listed in Table A all refer to the indicators of the powder of the carbon nanostructure-containing composite. If the carbon nanostructure-containing composite is a slurry, the above indicators are the indicators of the powder before preparing the slurry.

When the carbon nanostructure-containing composite is powder, the carbon nanostructure-containing composite powder has the following properties in addition to the performance indicators described in Table A:

black powder, uniform fineness, without obvious large particles, water content ≥3.0%, particle size D90≥10.0 μm, pH 5.0 to 8.0, and apparent density of 0.2 to 0.4 g/cm$^3$.

When the carbon nanostructure-containing composite is a slurry, it is a product obtained by dispersing carbon nanostructure-containing composite in a solvent, and the carbon nanostructure-containing composite slurry has the following properties in addition to the performance indicators described in Table A:
solid content of 1.0-10.0%, particle size D50≥0.7 μm, pH 8.0 to 10.0, Zeta potential ≥−10 mV, and viscosity of 5.0 to 8.0 mpa·s.

The present disclosure provides a method for preparing a functional regenerated cellulose fiber comprising the following steps: dissolving cellulose pulp with the NMMO solution, introducing a substance containing a graphene structure and non-carbon non-oxygen elements to obtain a spinning dope, and preparing regenerated cellulose fiber using the spinning dope.

The production process of the regenerated cellulose fiber is a spinning process using N-methylmorpholine-N-oxide (NMMO) solvent. The specific method includes: directly mixing cellulose pulp with N-methylmorpholine-N-oxide (NMMO), adding additives (such as $CaCl_2$)) and antioxidants (such as PG) to prevent the oxidative decomposition of the fiber during dissolving process, and adjusting the viscosity of the solution and improving the performance of the fiber. The water content was controlled to be less than 133% to achieve insolubility at best. The mixture was dissolved at 85 to 125° C. to obtain a solution with higher concentration, and the solution was wet or dry spun at 88 to 125° C. after being filtered and defoamed, then solidified and shaped in water-soluble or water/NMMO systems at a low temperature, then subjected to stretching, water washing, degreasing, drying and solvent recovery processes to prepare the fibers. The substance containing a graphene structure and non-carbon non-oxygen elements is introduced in the cellulose pulp.

The present disclosure provides an article, which comprises the functional regenerated cellulose fiber according to any one of the above technical solutions or the regenerated cellulose fiber prepared by the method according to any one of the above technical solutions. The article includes civilian clothing, home textiles, ultraviolet protective fabrics or special protective clothing for industry use.

For the functional regenerated cellulose fiber and its preparation process and application article provided by the present disclosure, a graphene structure and non-carbon non-oxygen elements are introduced in the traditional regenerated cellulose fiber; through matching and combining of the graphene structure and elements of Fe, Si, and Al, the regenerated cellulose fiber provided by the present disclosure can have various properties of far infrared property and bacteria resistance and inhibition; and by controlling a specific adding proportion, the regenerated cellulose fiber provided by the present disclosure can have a higher far infrared effect and bacteria inhibition effect. In addition, a substance containing a graphene structure and non-carbon non-oxygen elements is introduced in the form of a carbon nanostructure-containing composite in the present disclosure, and in the process of introduction, it is not necessary to carry out the pretreatment of the substances such as activation, and modification, etc., to achieve the effective combination with the regenerated cellulose and bring about additionally enhanced far infrared effect and bacteria inhibition effect.

A first method for determining the content of non-carbon non-oxygen non-hydrogen element of the functional fiber in the present disclosure is:
decomposing fiber with nitric acid (p=1.42 g/mL), perchloric acid (p=1.67 g/mL) and hydrofluoric acid (p=1.16 g/mL), maintaining the temperature in nitric acid medium, determining the volume, then quantitatively analyzing the content of elements P, Si, Ca, Al, and Na, etc., in the carbon nanostructure-containing composite with inductively coupled plasma atomic emission spectrometer using standard curve method.

Note: Before the fiber is detected, the influence of processes such as oiling, etc., at the later stage is firstly removed, and the influencing elements mainly include silicone oil, etc., and the removing method is boiling, multiple washing, etc.

A second method for determining the content of non-carbon non-oxygen non-hydrogen element is:
using the National Standard GB/T17359-1998: General specification of X-ray energy spectra quantitative analysis for electronic probe and scanning electron microscope.

There is no restriction to the method for determining non-carbon non-oxygen non-hydrogen element in the present disclosure, and any of the methods known in the art or new determining method can be used in the present disclosure. The present disclosure provides two methods for determining the content of non-carbon non-oxygen non-hydrogen element, preferably "first method for determining the content of non-carbon non-oxygen non-hydrogen element" is used. The "first method for determining the content of non-carbon non-oxygen non-hydrogen element" is used in the examples of the present disclosure.

The non-carbon non-oxygen elements of the present disclosure are elements inside the fiber that cannot be removed by simple multiple washing.

The far infrared property and bacteria resistance of the functional fiber are detected in the present disclosure, and the testing standard is as follows:
infrared detection data are tested by National textile products quality supervision and inspection center according to FZ/T64010-2000 test method;
bacteria inhibition test data are tested by National textile products quality supervision and inspection center according to GB/T20944.3-2008 test method.

Experimental results show that the far infrared property of the regenerated cellulose fiber provided by the present disclosure can reach a maximum of 0.93, and the bacteria inhibition property can reach a maximum of 99%.

In order to further explain the present disclosure, the functional regenerated cellulose fiber and its preparation process and application provided by the present disclosure are described in detail in combination with examples below, and the protection scope of the present disclosure is not limited by the following examples.

Example 1

A carbon nanostructure-containing composite was obtained by the following method:
(1) mixing corncob cellulose and ferrous chloride in a mass ratio of 1:1, stirring at 150° C. and catalyzing for 4 hours, drying until the water content of the precursor being 10 wt %, to obtain a precursor;
(2) under a protective atmosphere, heating the precursor to 170° C. at a heating rate of 3° C./min, and maintaining the temperature for 2 hours, then heating by temperature programming to 400° C. at a heating rate of 15° C./min, maintaining the temperature for 3 hours and then heating to 1200° C. and maintaining the temperature for 3 hours to obtain a crude product;
(3) at a temperature of 55 to 65° C., washing the crude product with sodium hydroxide solution having a concentration of 10 wt % and with hydrochloric acid having a concentration of 4 wt % and then with water to obtain a carbon nanostructure-containing composite.

The carbon nanostructure-containing composite prepared in Example 1 was determined by Raman spectrum, and the results show that the peak height ratio of G peak to D peak is 3.

It is determined by the "first method for determining the content of non-carbon non-oxygen element" that the carbon nanostructure-containing composite primarily comprises elements of P, Si, Ca, Al, Fe, and Mg, the content of which is 3.2 wt %.

Example 2

Corncob cellulose in Example 1 was replaced with reed cellulose.

The carbon nanostructure-containing composite prepared in Example 2 was determined by Raman spectrum, and the results show that the peak height ratio of G peak to D peak is 4.8;

It is determined by the "first method for determining the content of non-carbon non-oxygen element" that the carbon nanostructure-containing composite primarily comprises elements of Si, Ca, Al, Fe, Mg and S, the content of which is 2.5 wt %.

Example 3

Corncob cellulose in Example 1 was replaced with poplar cellulose.

The carbon nanostructure-containing composite prepared in Example 3 was determined by Raman spectrum, and the results show that the peak height ratio of G peak to D peak is 4.6;

It is determined by the "first method for determining the content of non-carbon non-oxygen element" that the carbon nanostructure-containing composite primarily comprises elements of P, Si, Al, Na, Fe and Ni, the content of which is 3.5 wt %.

Example 4

Corncob cellulose in Example 1 was replaced with corncob lignin.

The carbon nanostructure-containing composite prepared in Example 4 was determined by Raman spectrum, and the results show that the peak height ratio of G peak to D peak is 2.8;

It is determined by the "first method for determining the content of non-carbon non-oxygen element" that the carbon nanostructure-containing composite primarily comprises elements of P, Si, Ca, Al, Na, Fe, Mg, Fe, Mg and K, the content of which is 2.7 wt %.

Example 5

The ready-to-use corncob material was added to 3-fold amount of 44% zinc chloride solution (adjusted to pH=1 with hydrochloric acid), thoroughly stirred and impregnated, and stood still to absorb for 5 hours. The mixture was again thoroughly stirred and stood still to absorb for 5 hours until zinc chloride solution was completely absorbed. The mixture was then transferred into an open flat carbonization furnace for sealed carbonization at 400° C. for 3 hours, thoroughly stirred about every 30 minutes. The temperature of the furnace was reduced to below 100° C. before stirring, and then raised for sealed carbonization after stirring until black coke was formed. Then the mixture was discharged and cooled, impregnated with 44% zinc chloride solution (pH=1) in a 2-fold amount, fully stirred, so that the zinc chloride solution was completely absorbed. The resulting mixture was transferred into an activation furnace to activate at 650° C. for 70 minutes, discharged and cooled, transferred into a wooden barrel. Then an equal amount of 40% ammonium chloride solution was added thereto, thoroughly stirred and washed, stood and clarified, and the supernatant was siphoned, then washed with 30%, 12% and 3% ammonium chloride solution successively under stirring, then with an equal amount of 30% hydrochloric acid. Carbon granules were filtered out and put into a kettle, and an equal volume of clear water was added thereto. The mixture was boiled and washed until there was no ammonium chloride, and then heated and evaporated, stirred and stir-fried to remove moisture, oven-dried and smashed, screened with a 120-mesh sieve to obtain active carbon. Graphene was introduced on such a basis, and nano-materials containing P, Si, Ca, Al, Fe and Mg were added in an amount of 3.5 wt %, specifically the materials such as nano-phosphorus pentoxide, nano-silicon powder, nano-calcium carbonate, nano-aluminum oxide, nano-iron and nano-magnesium powder were added, to obtain a carbon nanostructure-containing composite.

Example 6

The lignin was sealed and carbonized in a carbonization furnace at 400° C. for 3 hours, thoroughly stirred about every 30 minutes. The temperature of the furnace was reduced to below 100° C. before stirring, and raised to 2200° C. under an argon gas condition after stirring, then the carbonization furnace was sealed to graphitize for 2 hours. The resulting material was discharged and cooled, washed with 30%, 12% and 3% ammonium chloride solution successively under stirring, then with an equal amount of 30% hydrochloric acid, oven-dried and smashed, screened with a 120-mesh sieve to obtain a mixed carbon material of graphite and active carbon. Graphene was introduced on such a basis, and nano-materials containing P, Si, Ca, Al, Fe and Mg were added in an amount of 3.3 wt %. Specifically, the materials such as nano-phosphorus pentoxide, nano-silicon dioxide, nano-calcium carbonate, nano-aluminum powder, nano-iron and nano-magnesium carbonate were added to obtain a carbon nanostructure-containing composite.

Example 7

Phenolic resin foam plate was used to carbonize once at 330° C. to remove hydrogen and oxygen elements, then to carbonize at a high temperature of 700° C. Graphene was introduced on such a basis, and nano-materials containing P, Si, Ca, Al, Fe and Mg were added in an amount of 3.4 wt % to obtain a carbon nanostructure-containing composite.

Example 8

Active carbon and graphene were added to nano-graphite, and nano-materials containing P, Si, Ca, Al, Fe and Mg were added in an amount of 3.3 wt %, specifically the materials such as nano-phosphorus pentoxide, nano-silicon powder, nano-aluminum powder, nano-iron and nano-magnesium powder were added, to obtain a carbon nanostructure-containing composite.

Example 9

(1) Preparation of Porous Cellulose:

At a temperature of 90° C., an aqueous solution of corncobs was adjusted to pH=3 with sulfuric acid, soaked for 10 minutes for hydrolysis to obtain lignocellulose, wherein the mass of sulfuric acid was 3% of that of the corncobs; and then the resulting lignocellulose was soaked in acidic sulphite at 70° C. for 1 hour to obtain porous cellulose; wherein the acid was sulfuric acid and the sulphite was magnesium sulfite; the mass of sulfuric acid was 4% of that of the lignocellulose and the liquid-solid ratio was 2:1, the porous cellulose was made for ready use (this step can make reference to the patent document with Publication Number CN104016341A).

(2) The porous cellulose obtained in step (1) was mixed with ferric chloride in a mass ratio of 1:1, then stirred at 200° C. and catalyzed for 8 hours, dried until the water content of the precursor was 4 wt % to obtain a precursor; then under a protective atmosphere, the precursor was heated to 350° C. at a heating rate of 5° C./min, and maintained at that temperature for 2 hours, then heated by temperature programming to 1000° C. at a heating rate of 20° C./min, maintained at that temperature for 4 hours to obtain a crude product; at a temperature of 55 to 65° C., the crude product was acid washed with hydrochloric acid having a concentration of 4 wt %, then water washed to obtain a carbon nanostructure-containing composite.

The carbon nanostructure-containing composite prepared in Example 9 was determined by Raman spectrum, and the results show that the peak height ratio of G peak to D peak is 6.8;

It is determined by the first method for determining the content of non-carbon non-oxygen element" that the carbon nanostructure-containing composite primarily comprises elements of P, Si, Ca, Al, Na, Fe, Mg, Fe, Mg and K, the content of which is 3.5 wt %.

Example 10

The difference from Example 9 is that the step (2) is: the porous cellulose obtained in step (1) of Example 9 was mixed with manganese chloride in a mass ratio of 1:5, then stirred at 180° C. and catalyzed for 5 hours, dried until the water content of the precursor was 6 wt % to obtain a precursor; then under a protective atmosphere, the precursor was heated to 300° C. at a heating rate of 4° C./min and maintained at that temperature for 3 hours, then heated by temperature programming to 1000° C. at a heating rate of 17° C./min, maintained at the temperature for 4 hours to obtain a crude product; at 60° C., the crude product was acid washed with hydrochloric acid having a concentration of 5 wt %, then water washed to obtain a carbon nanostructure-containing composite.

The carbon nanostructure-containing composite prepared in Example 10 was determined by Raman spectrum, and the results show that the peak height ratio of G peak to D peak is 15;

It is determined by the "first method for determining the content of non-carbon non-oxygen element" that the carbon nanostructure-containing composite primarily comprises elements of P, Si, Ca, Al, Na, Fe, Mg, Mn and S, the content of which is 5.7 wt %.

Example 11

(1) After wheat straw was smashed, the treated wheat straw was cooked using an organic acid solution of formic acid and acetic acid having a total acid concentration of 80 wt %, the mass ratio of acetic acid to formic acid in the organic acid solution of the present example was 1:12, and hydrogen peroxide ($H_2O_2$) in an amount of 1 wt % of the wheat straw raw material was added as a catalyst before the raw material was added, and the reaction temperature was controlled at 120° C. to react for 30 minutes, with a solid-liquid mass ratio of 1:10. The obtained reaction solution was subjected to a first solid-liquid separation. The solid obtained by the first solid-liquid separation was added to an organic acid solution of formic acid and acetic acid having a total acid concentration of 75 wt % for acid washing for 1 hour, wherein hydrogen peroxide ($H_2O_2$) in an amount of 8 wt % of the wheat straw raw material was added to the organic acid solution having a total acid concentration of 75 wt % as a catalyst and the mass ratio of acetic acid to formic acid was 1:12, the temperature was controlled at 90° C., and the solid-liquid mass ratio was 1:9. The reaction solution was subjected to a second solid-liquid separation. The liquids obtained by the first and second solid-liquid separations were collected and evaporated at high temperature and high pressure of 120° C. and 301 kPa until dryness. The formic acid and acetic acid vapors thus obtained were condensed and refluxed to the reaction kettle of step (1) as cooking liquor for the cooking in step (1). The solid obtained by the second solid-liquid separation was collected and washed with water. The temperature for water washing was controlled at 80° C., and the water washed pulp had a concentration of 6 wt % and was subjected to a third solid-liquid separation. The liquid obtained by the third solid-liquid separation was collected, subjected to water and acid distillation, and the resulting mixed acid solution was returned to the reaction kettle of step (1) as cooking liquor for the cooking in step (1), and the resulting water was returned to step (5) for the water washing. The solid obtained by the third solid-liquid separation was collected and screened to obtain the desired fine pulp cellulose (this step can make reference to the patent document with Publication Number CN103898782A).

(2) The cellulose obtained in preparation example 2 was mixed with ferrous chloride in a mass ratio of 1:0.1, then stirred at 150° C. and catalyzed for 4 hours, dried until the water content of the precursor was 10 wt % to obtain a precursor; then under a protective atmosphere, the precursor was heated to 280° C. at a heating rate of 3° C./min and maintained at that temperature for 2 hours, then heated by temperature programming to 950° C. at a heating rate of 15° C./min, maintained at that temperature for 3 hours to obtain a crude product; at a temperature of 55 to 65° C., the crude product was acid washed with hydrochloric acid having a concentration of 4 wt %, then water washed to obtain a carbon nanostructure-containing composite.

The carbon nanostructure-containing composite prepared in Example 11 was determined by Raman spectrum, and the results show that the peak height ratio of G peak to D peak is 3.

It is determined by the "first method for determining the content of non-carbon non-oxygen element" that the carbon nanostructure-containing composite primarily comprises elements of P, Si, Ca, Al, Na, Fe, and Mg, the content of which is 0.7 wt %.

Example 12

The difference from Example 11 is that the step (2) is: the cellulose obtained in step (1) of Example 11 was mixed with ferric chloride in a mass ratio of 1:1, then stirred at 200°

C. and catalyzed for 8 hours, dried until the water content of the precursor was 8 wt % to obtain a precursor; then under a protective atmosphere, the precursor was heated to 350° C. at a heating rate of 5° C./min and maintained at that temperature for 2 hours, then heated by temperature programming to 1050° C. at a heating rate of 20° C./min, maintained at that temperature for 4 hours to obtain a crude product; at a temperature of 55 to 65° C., the crude product was acid washed with hydrochloric acid having a concentration of 6 wt %, then water washed to obtain a carbon nanostructure-containing composite.

The carbon nanostructure-containing composite prepared in Example 12 was determined by Raman spectrum, and the results show that the peak height ratio of G peak to D peak is 4.8;

It is determined by the "first method for determining the content of non-carbon non-oxygen element" that the carbon nanostructure-containing composite primarily comprises elements of P, Si, Ca, Al, Na, Fe, and Mg, the content of which is 3.1 wt %.

Example 13

(1) After poplar or eucalyptus branches and leaves were smashed, the treated lignocellulosic biomass was acid hydrolyzed using an organic acid solution containing 90% formic acid, 5% acetic acid and 5% water, wherein the reaction temperature was controlled at 165° C. and the reaction was conducted for 10 minutes, and the liquid-solid mass ratio of the mixed acid solution of formic acid and acetic acid and the biomass raw material was 1:20. The obtained reaction solution was subjected to a first solid-liquid separation. The solid obtained by the separation in step (1) was added to an organic acid solution containing 90% formic acid, 5% acetic acid and 5% water for acid washing at a temperature of 60 to 80° C. for 0.5 to 1 hour. Then the reaction liquid was subjected to a second solid-liquid separation. The separated solid was subjected to water washing to obtain the desired cellulose. (3) The liquid obtained by the solid-liquid separation in step (1) and step (2) was collected, subjected to vacuum distillation to concentrate to obtain formic acid and acetic acid vapors, and a concentrated liquid having a concentration of 4 to 5 times that of the original liquid. (4) The formic acid and acetic acid vapors distilled out in step (3) were condensed and returned to the reaction kettle of step (1) for the acid hydrolysis in step (1). (5) The concentrated liquid obtained in step (3) was dilute with water, and the mass ratio of the auxiliary agent to the concentrated liquid was 2:1. The resulting mixture was controlled at a temperature of 60 to 70° C. and stirred for 0.5 to 1 hour, and then subjected to a third solid-liquid separation. Water was added to the obtained solid (the mass ratio of water to the solid was 3:1), and the resulting mixture was stirred at 75 to 80° C. for 2 to 3 hours for water washing de-esterifying to obtain the desired lignin (this step can make reference to the Publication Number CN103131018A entitled "Comprehensive utilization process of a lignocellulosic biomass").

(2) The poplar cellulose obtained in preparation example 3 was mixed with ferric chloride in a mass ratio of 1:1, then stirred at 200° C. and catalyzed for 8 hours, dried until the water content of the precursor was 8 wt % to obtain a precursor; then under a protective atmosphere, the precursor was heated to 350° C. at a heating rate of 5° C./min and maintained at that temperature for 2 hours, then heated by temperature programming to 1050° C. at a heating rate of 20° C./min, and maintained at that temperature for 4 hours to obtain a crude product; at a temperature of 55 to 65° C., the crude product was acid washed with hydrochloric acid having a concentration of 6 wt %, then water washed to obtain a carbon nanostructure-containing composite.

The carbon nanostructure-containing composite prepared in Example 13 was determined by Raman spectrum, and the results show that the peak height ratio of G peak to D peak is 4.6;

It is determined by the "first method for determining the content of non-carbon non-oxygen element" that the carbon nanostructure-containing composite primarily comprises elements of P, Si, Ca, Al, Na, Fe, Mg, Ni and K, the content of which is 3.6 wt %.

Example 14

The difference from Example 13 is that the step (2) is: the eucalyptus cellulose obtained in step (1) of Example 13 was mixed with nickel chloride in a mass ratio of 1:0.5, then stirred at 170° C. and catalyzed for 5 hours, dried until the water content of the precursor was 6 wt % to obtain a precursor; then under a protective atmosphere, the precursor was heated to 300° C. at a heating rate of 4° C./min and maintained at that temperature for 3 hours, then heated by temperature programming to 1000° C. at a heating rate of 17° C./min and maintained at that temperature for 4 hours to obtain a crude product; at a temperature of 60° C., the crude product was acid washed with hydrochloric acid having a concentration of 5 wt %, then water washed to obtain a carbon nanostructure-containing composite.

The carbon nanostructure-containing composite prepared in Example 14 was determined by Raman spectrum, and the results show that the peak height ratio of G peak to D peak is 2.1;

It is determined by the "first method for determining the content of non-carbon non-oxygen element" that the carbon nanostructure-containing composite primarily comprises elements of P, Si, Ca, Al, Na, Fe, Mg, Ni and K, the content of which is 1.6 wt %.

Example 15

The difference from Example 13 is that the step (2) is: the poplar cellulose obtained in preparation example 3 was mixed with ferrous chloride in a mass ratio of 1:3, then stirred at 180° C. and catalyzed for 5 hours, dried until the water content of the precursor was 6 wt % to obtain a precursor; then under a protective atmosphere, the precursor was heated to 300° C. at a heating rate of 4° C./min and maintained at that temperature for 3 hours, then heated by temperature programming to 1000° C. at a heating rate of 17° C./min, and maintained at that temperature for 4 hours to obtain a crude product; at a temperature of 60° C., the crude product was acid washed with hydrochloric acid having a concentration of 5 wt %, then water washed to obtain a carbon nanostructure-containing composite.

The carbon nanostructure-containing composite prepared in Example 15 was determined by Raman spectrum, and the results showed that the peak height ratio of G peak to D peak is 2.1;

It was determined by the "first method for determining the content of non-carbon non-oxygen element" that the carbon nanostructure-containing composite primarily comprises elements of P, Si, Ca, Al, Na, Fe, Mg, Ni and K, the content of which is 4.7 wt %.

Comparative Example 1

The graphene obtained according to Example 7 disclosed in CN104016341A entitled "A preparation method of porous graphene" was used as Comparative Example 1. The graphene prepared in Comparative Example was determined by Raman spectrum, and the results show that the peak height ratio of G peak to D peak is 13.

Comparative Example 2

A phosphorus-doped graphene was prepared according to a method disclosed in CN103508444A, specifically:
1 g of graphite with a purity of 95% was added to 24 ml of concentrated nitric acid with a mass fraction of 65% and 90 ml of concentrated sulfuric acid with a mass fraction of 98% and mixed. The mixture was stirred in an ice-water bath for 20 minutes, and then potassium permanganate was slowly added to the mixture with a mass ratio of potassium permanganate to graphite of 5:1, the mixture was stirred for 1 hour, then heated to 85° C. for 30 minutes. Then deionized water was added thereto and the resulting mixture was maintained at 85° C. for 30 minutes, wherein the liquid-to-solid ratio of deionized water to graphite was 90 mL:1 g. Finally hydrogen peroxide solution with a mass fraction of 30% was added and the mixture was stirred for 10 minutes, wherein the liquid-to-solid ratio of hydrogen peroxide solution to graphite was 10 mL:1 g. Then the mixture was filtered by suction, and the solids were washed successively with dilute hydrochloric acid and deionized water for three times in total, wherein the solid-liquid ratio of dilute hydrochloric acid, deionized water and graphite was 100 mL: 150 mL: 1 g. Finally the solid matter was dried in a vacuum oven at 60° C. for 12 hours to obtain graphite oxide. The graphite oxide and phosphorus pentoxide were mixed uniformly at a mass ratio of 1:2, and the mixture was placed in an argon atmosphere with a flow rate of 300 ml/min, then heated to 900° C. at a heating rate of 15° C./min for 2 hours, subsequently cooled to room temperature in an argon atmosphere with a flow rate of 300 ml/min to obtain a phosphorus-doped graphene;

The phosphorus-doped graphene prepared in Comparative Example 2 was determined by Raman spectrum, and the results show that the peak height ratio of G peak to D peak is 5;

It is determined by the "first method for determining the content of non-carbon non-oxygen elements" that the carbon nanostructure-containing composite primarily comprises element P.

Comparative Example 3

Parallel Comparative Experimental Example

Using an active carbon/graphene composite and its preparation method disclosed in Example 1 of CN104118874A, an active carbon containing graphene was prepared, and the prepared active carbon comprises elements of P, Si, Ca, Fe, Mg, and Mn.

The active carbon/graphene composite prepared in Comparative Example 3 was determined by Raman spectrum, and the results show that the peak height ratio of G peak to D peak is 0.5;

It was determined by the "first method for determining the content of non-carbon non-oxygen non-hydrogen element" that the obtained active carbon/graphene composite comprises elements of S, N and Cl.

Functional regenerated cellulose fiber was prepared using the carbon nanostructure-containing composite prepared by Examples 1-15 and Comparative Examples 1-3.

Taking viscose fiber as an example, the viscose liquid used in the present disclosure is a viscose liquid well-known in the prior art. Its preparation method comprises using pulp as a raw material, and carrying out procedures such as impregnation, pressing, smashing, aging, yellowing, dissolving, ripening, filtering and defoaming, etc. The pulp was impregnated with an aqueous solution of sodium hydroxide having a concentration of about 18%, so that the cellulose was converted into alkali cellulose, the hemicellulose was dissolved out, the degree of polymerization was partially reduced; and the excess alkali liquor was removed by pressing. Bulk alkali cellulose was smashed by a crusher and turned into loose floccus, resulting in an increase in the uniformity of the subsequent chemical reaction due to an increase in surface area. Alkali cellulose underwent oxidative cleavage under the action of oxygen to reduce the average degree of polymerization. This process is called aging. After aging, alkali cellulose was reacted with carbon disulfide to generate cellulose xanthate, the process of which is called yellowing, and the hydrogen bond between macromolecules were further weakened. Due to the hydrophilicity of the xanthic acid group, the solubility of the cellulose xanthate in the dilute alkali solution was greatly improved. Solid cellulose xanthate was dissolved in dilute alkali solution, forming viscose. The freshly made viscose was not easy to be shaped due to its high viscosity and salt value. It must be placed at a certain temperature for a certain period of time, the process of which is called ripening, to gradually hydrolyze and saponify the sodium cellulose xanthate in the viscose, and thereby the degree of esterification was decreased, and viscosity and stability to the actions of electrolyte would change accordingly. After ripening, defoaming and filtration should be performed to remove air bubbles and impurities. Specifically as follows:

(1) Process flow of viscose fiber filaments was shown in FIG. 1. FIG. 1 is a process flow chart of viscose fiber filaments.

(2) Conditions for alkaline impregnation process

Alkaline solution (NaOH): concentration of 240 g/L, temperature of 20° C.

Impregnation time: 120 minutes (3) Conditions for aging process

Temperature of 25° C., time of 34 hours (4) Conditions for yellowing process

Yellowing method: Wet yellowing

Alkalization: time of 30 minutes, temperature of 21.0±0.5° C.

Yellowing: time of 120 minutes, initial temperature of 21.0±0.5° C., final temperature of 30.0±0.5° C.

Addition amount of $CS_2$: 34.5% (for methylcellulose)

Pre-dissolution: time of 120 minutes, temperature of 16.5±0.5° C.

Post-dissolution: time of 180 minutes, temperature of 16.5±0.5° C.

(5) The composition of the resulting viscose:

| | |
|---|---|
| Methylcellulose | 8.30 ± 0.10% |
| NaOH | 5.80 ± 0.10% |
| S | 2.25 ± 0.1% |

(6) Conditions for ripening viscose

Time of 36 to 38 hours

Temperature of 19.0±0.5° C.

(7) Conditions of the obtained spinning dope

| Viscosity | 30 to 40 seconds (20° C., Falling-ball method) |
|---|---|
| Degree of ripeness | 7.8-8.6 ml (10% NH$_4$Cl value) |

(8) Conditions for spinning process:
Spinning speed: 82 m/min
Drafting: 25%
Tension drafting: 4.12%
(9) Conditions of coagulation bath
Compositions of acid bath:

| H$_2$SO$_4$ | 132.0 ± 1.0 g/L |
|---|---|
| ZnSO$_4$ | 10.5 ± 0.5 g/L |
| Na$_2$SO$_4$ | 265.0 ± 5.0 g/L |
| Temperature: | 52.0 ± 1.0° C. |
| Specific gravity: | 1.270 ± 0.005 |
| Temperature: | 45 to 50° C. |

In general, graphene structure and non-carbon non-oxygen element may be introduced in multiple steps for preparing the viscose liquid described above, for example, before smashing, or before aging, before yellowing, or before ripening. Usually, graphene structure and non-carbon non-oxygen element will not be introduced after filtration or defoaming steps. Graphene structure and non-carbon non-oxygen element are preferably introduced after ripening and before filtration in the present disclosure, and the inventors have found that the mixing efficiency is higher and the time for mixing can be reduced to more than half, usually reduced to one-third of time, if graphene structure and the substance containing non-carbon non-oxygen element (for example, the carbon nanostructure-containing composites) is added at this time.

In the present disclosure, the graphene structure and the substance containing non-carbon non-oxygen element are preferably first made into a dispersion system, and then the dispersion solution and the viscose liquid are uniformly mixed. The preferred dispersion solvent is water. The composite containing graphene structure is preferably made into a dispersion system having a solid content of 0.1% to 10%.

A more preferred method is firstly dispersing a composite containing a graphene structure in a dilute alkali solution for dissolving cellulose xanthate, and then adding the yellowed cellulose i.e., cellulose xanthate after dispersing. The advantage of this method is that it is not necessary to introduce water because of the introduction of the graphene structure. Once dissolving, the cellulose combines with the graphene structure and the mixing is more uniform. In this embodiment, when the graphene structure is dispersed in the dilute alkali solution and after the cellulose xanthate is added, it is not necessary to stir for a long time, and after the ripening, the stirring is performed for a short time, and the dispersing efficiency of the graphene structure can be greatly improved.

Next, spinning, desulfurization, water washing, oiling, and drying are performed after filtration and defoaming to obtain the final viscose fiber. These belong to traditional methods and are not described in detail herein.

Specifically, corn cobs were used as raw materials, and were impregnated and alkalized, pressed, smashed, aged, yellowed, dissolved, and ripened to obtain a viscose liquid with a solid content of 8%; the raw materials used for obtaining the graphene structure in Examples 1 to 8 and Comparative Examples 1 to 3 were dispersed in 5-fold mass of water, then the graphene structure dispersion liquid was blended with the viscose liquid, the mixture was stirred for 1 hour with a high-speed stirrer to form a blended solution. The used amount of the graphene structure-containing composite was 0.7%, 1.5%, 3%, 5% and 10% by mass of the cellulose. The functional viscose fiber was obtained by filtration, defoaming, then spinning, desulfurization, water washing and drying. Among them, the compositions of the coagulation bath are as follows: sulfuric acid 105 g/l, sodium sulfate 200 g/l, and zinc sulfate 12 g/l. The far infrared property and bacteria resistance of the functional fiber are detected, and the testing standard is as follows:
infrared detection data are tested by National textile products quality supervision and inspection center according to FZ/T64010-2000 test method.
bacteria inhibition test data are tested by National textile products quality supervision and inspection center according to GB/T20944.3-2008 test method.

Test Results:
Raw materials containing a graphene structure and non-carbon non-oxygen elements prepared in Examples 1 to 15 and Comparative Examples 1 to 3 were added.

The functional viscose fibers were prepared when the addition amount was 0.7%:

| Raw materials | The sum of contents of elements of Fe, Si and Al in viscose fiber, % | The sum of the contents of non-carbon non-oxygen non-hydrogen elements in viscose fiber, % | Far infrared property (Normal emissivity) | Anti-bacterial rate % |
|---|---|---|---|---|
| Example 1 | 0.017 | 0.0224 | 0.78 | 32 |
| Example 2 | 0.015 | 0.0175 | 0.79 | 32 |
| Example 3 | 0.022 | 0.0245 | 0.78 | 30 |
| Example 4 | 0.017 | 0.0189 | 0.79 | 30 |
| Example 5 | 0.021 | 0.0245 | 0.77 | 32 |
| Example 6 | 0.020 | 0.0231 | 0.77 | 30 |
| Example 7 | 0.021 | 0.0238 | 0.77 | 31 |
| Example 8 | 0.021 | 0.0231 | 0.77 | 30 |
| Example 9 | 0.021 | 0.0245 | 0.80 | 30 |
| Example 10 | 0.035 | 0.0399 | 0.87 | 92 |
| Example 11 | 0.004 | 0.0049 | 0.78 | 28 |
| Example 12 | 0.020 | 0.0217 | 0.78 | 28 |
| Example 13 | 0.021 | 0.0252 | 0.77 | 28 |
| Example 14 | 0.010 | 0.0112 | 0.75 | 29 |
| Example 15 | 0.029 | 0.0329 | 0.88 | 95 |
| Comparative Example 1 | — | — | 0.76 | 35 |
| Comparative Example 2 | — | — | 0.76 | 40 |
| Comparative Example3 | — | — | 0.77 | 38 |

The functional viscose fibers were prepared when the addition amount was 1.5%:

| Raw materials | The sum of contents of elements of Fe, Si and Al in viscose fiber, % | The sum of the content of the non-carbon non-oxygen non-hydrogen element in viscose fiber, % | Far infrared property (Normal emissivity) | Anti-bacterial rate % |
|---|---|---|---|---|
| Example 1 | 0.041 | 0.048 | 0.88 | 99 |
| Example 2 | 0.033 | 0.038 | 0.85 | 99 |
| Example 3 | 0.047 | 0.053 | 0.85 | 99 |
| Example 4 | 0.037 | 0.041 | 0.84 | 88 |
| Example 5 | 0.045 | 0.053 | 0.83 | 81 |
| Example 6 | 0.043 | 0.050 | 0.82 | 83 |
| Example 7 | 0.045 | 0.051 | 0.82 | 86 |

The functional viscose fibers were prepared when the addition amount was 3%:

| Raw materials | The sum of contents of elements of Fe, Si and Al in viscose fiber, % | The sum of the content of the non-carbon non-oxygen non-hydrogen element in viscose fiber, % | Far infrared property (Normal emissivity) | Anti-bacterial rate % |
|---|---|---|---|---|
| Example 8 | 0.045 | 0.050 | 0.83 | 84 |
| Example 9 | 0.045 | 0.053 | 0.89 | 99 |
| Example 10 | 0.074 | 0.086 | 0.89 | 99 |
| Example 11 | 0.009 | 0.011 | 0.78 | 45 |
| Example 12 | 0.042 | 0.047 | 0.90 | 99 |
| Example 13 | 0.046 | 0.054 | 0.88 | 99 |
| Example 14 | 0.021 | 0.024 | 0.80 | 33 |
| Example 15 | 0.063 | 0.071 | 0.88 | 99 |
| Comparative Example 1 | — | — | 0.74 | 45 |
| Comparative Example 2 | — | — | 0.75 | 45 |
| Comparative Example 3 | — | — | 0.72 | 30 |

The functional viscose fibers were prepared when the addition amount was 5%:

| Raw materials | The sum of contents of elements of Fe, Si and Al in viscose fiber, % | The sum of the content of the non-carbon non-oxygen non-hydrogen element in viscose fiber, % | Far infrared property (Normal emissivity) | Anti-bacterial rate % |
|---|---|---|---|---|
| Example 1 | 0.082 | 0.096 | 0.90 | 99 |
| Example 2 | 0.065 | 0.075 | 0.91 | 99 |
| Example 3 | 0.093 | 0.105 | 0.91 | 99 |
| Example 4 | 0.074 | 0.081 | 0.87 | 95 |
| Example 5 | 0.089 | 0.105 | 0.85 | 88 |
| Example 6 | 0.086 | 0.099 | 0.85 | 88 |
| Example 7 | 0.091 | 0.102 | 0.85 | 88 |
| Example 8 | 0.090 | 0.099 | 0.85 | 88 |
| Example 9 | 0.089 | 0.105 | 0.89 | 99 |
| Example 10 | 0.149 | 0.171 | 0.89 | 99 |
| Example 11 | 0.019 | 0.021 | 0.78 | 45 |
| Example 12 | 0.085 | 0.093 | 0.90 | 99 |
| Example 13 | 0.092 | 0.108 | 0.89 | 99 |
| Example 14 | 0.042 | 0.048 | 0.89 | 99 |
| Example 15 | 0.125 | 0.141 | 0.91 | 99 |
| Comparative Example 1 | — | — | 0.75 | 43 |
| Comparative Example 2 | — | — | 0.74 | 44 |
| Comparative Example 3 | — | — | 0.74 | 32 |

The functional viscose fibers were prepared when the addition amount was 5%:

| Raw materials | The sum of contents of elements of Fe, Si and Al in viscose fiber, % | The sum of the content of the non-carbon non-oxygen non-hydrogen element in viscose fiber, % | Far infrared property (Normal emissivity) | Anti-bacterial rate % |
|---|---|---|---|---|
| Example 1 | 0.136 | 0.160 | 0.92 | 99 |
| Example 2 | 0.109 | 0.125 | 0.92 | 99 |
| Example 3 | 0.156 | 0.175 | 0.91 | 99 |
| Example 4 | 0.123 | 0.135 | 0.88 | 95 |
| Example 5 | 0.149 | 0.175 | 0.86 | 87 |
| Example 6 | 0.144 | 0.165 | 0.86 | 92 |
| Example 7 | 0.151 | 0.170 | 0.87 | 92 |
| Example 8 | 0.150 | 0.165 | 0.86 | 88 |
| Example 9 | 0.149 | 0.175 | 0.90 | 99 |
| Example 10 | 0.248 | 0.285 | 0.89 | 99 |
| Example 11 | 0.031 | 0.035 | 0.90 | 99 |
| Example 12 | 0.141 | 0.155 | 0.90 | 99 |
| Example 13 | 0.153 | 0.180 | 0.89 | 99 |
| Example 14 | 0.070 | 0.080 | 0.89 | 99 |
| Example 15 | 0.209 | 0.235 | 0.92 | 99 |
| Comparative Example 1 | — | — | 0.77 | 45 |
| Comparative Example 2 | — | — | 0.76 | 45 |
| Comparative Example 3 | — | — | 0.77 | 40 |

The functional viscose fibers were prepared when the addition amount was 10%:

| Raw materials | The sum of the contents of elements of Fe, Si and Al in viscose fiber, % | The sum of the contents of the non-carbon non-oxygen non-hydrogen elements in viscose fiber, % | Far infrared property (Normal emissivity) | Anti-bacterial rate % |
|---|---|---|---|---|
| Example 1 | 0.272 | 0.320 | 0.89 | 90 |
| Example 2 | 0.218 | 0.250 | 0.88 | 90 |
| Example 3 | 0.312 | 0.350 | 0.88 | 91 |
| Example 4 | 0.246 | 0.270 | 0.86 | 90 |
| Example 5 | 0.298 | 0.350 | 0.85 | 85 |
| Example 6 | 0.287 | 0.330 | 0.85 | 82 |
| Example 7 | 0.303 | 0.340 | 0.85 | 82 |
| Example 8 | 0.300 | 0.330 | 0.85 | 82 |
| Example 9 | 0.298 | 0.350 | 0.87 | 82 |
| Example 10 | 0.496 | 0.570 | 0.87 | 84 |
| Example 11 | 0.062 | 0.070 | 0.87 | 83 |
| Example 12 | 0.282 | 0.310 | 0.86 | 83 |
| Example 13 | 0.306 | 0.360 | 0.86 | 84 |
| Example 14 | 0.139 | 0.160 | 0.87 | 79 |
| Example 15 | 0.418 | 0.470 | 0.87 | 79 |
| Comparative Example 1 | — | — | 0.77 | 40 |
| Comparative Example 2 | — | — | 0.76 | 40 |
| Comparative Example 3 | — | — | 0.77 | 40 |

As can be seen from the above examples and comparative examples, many trace elements exist in the plant itself, and if the substances containing a graphene structure and trace elements are directly prepared by using the plant itself, the individual components in the product are more uniformly dispersed, such as trace elements, and the effect that can be achieved when combined with a polymer material or the like is more excellent; and if trace elements were introduced in a later stage, the effect would be more obvious only when the mixing is more uniform and the effect is worse than that of the naturally formed ones.

When the addition amount of the carbon nanostructure-containing composite exceeds 5 wt %, especially when it exceeds 10 wt %, the phenomenon of agglomeration tends to occur, resulting in uneven dispersion of the carbon nanostructure-containing composite in the fibers, and a reduction in the far-infrared and antibacterial effects. As long as the carbon nanostructure-containing composite has good dispersing ability in the fibers, it can be added continuously.

A functional regenerated cellulose fiber and its preparation method and application article provided by the present disclosure are described in detail hereinbefore. Specific examples are used herein to describe the principles and embodiments of the present disclosure. The above embodiments are only used to facilitate the understandings of the methods and the key ideas of the present disclosure. It should be noted that several improvements and modifications may be made by an ordinary person skilled in the art without departing from the principles of the present disclosure, and that such improvements and modifications also fall within the protection scope of the appended claims of the present disclosure.

What is claimed is:

1. A functional viscose fiber comprising:
   a carbon nanostructure-containing composite accounting for 1.5 wt % to 5 wt % of the functional viscose fiber, the carbon nanostructure-containing composite comprising:
   a graphene structure;
   amorphous carbon; and
   non-carbon non-oxygen elements, the non-carbon non-oxygen elements including elements of Fe, Si, and Al, the elements of Fe, Si, and Al accounting for 0.018 wt % to 0.8 wt % of the functional viscose fiber; and
   the content of the non-carbon non-oxygen elements is 0.5 wt % to 6 wt % of the carbon nanostructure-containing composite.

2. The functional viscose fiber according to claim 1, wherein the content of carbon element in the carbon nanostructure-containing composite is ≥80 wt %.

3. The functional viscose fiber according to claim 1, wherein the non-carbon non-oxygen elements account for 0.3 wt % to 5 wt % of the carbon nanostructure-containing composite.

4. The functional viscose fiber according to claim 1, wherein the non-carbon non-oxygen elements account for 1.5 wt % to 5 wt % of the carbon nanostructure-containing composite.

5. The functional viscose fiber according to claim 1, wherein the non-carbon non-oxygen elements are adsorbed on the surface or inside of carbon nanostructure in a form of any one or more of elementary substance, oxide, or carbide.

6. The functional viscose fiber according to claim 1, wherein the method for preparing the carbon nanostructure-containing composite includes:
   (1) under the action of a catalyst, catalytically treating a biomass carbon source to obtain a precursor;
   (2) under a condition of protective gas, maintaining the precursor at 140° C. to 180° C. for 1.5 to 2.5 hours to obtain a first intermediate;
   (3) under a condition of protective gas, heating the first intermediate to 350° C. to 450° C. and maintaining at that temperature for 3 to 4 hours to obtain a second intermediate;
   (4) under a condition of protective gas, heating the second intermediate to 1100° C. to 1300° C. and maintaining at that temperature for 2 to 4 hours to obtain a third intermediate; and
   (5) subjecting the third intermediate to alkali washing, acid washing and water washing successively to obtain a composite;
   the heating rate in step (3) and (4) is 14° C./min to 18° C./min.

7. The functional viscose fiber according to claim 6, wherein the biomass carbon source is one or more of lignocellulose, cellulose and lignin.

8. The functional viscose fiber according to claim 1, wherein the elements of Fe, Si, and Al account for 0.1 wt % to 0.7 wt % of the functional viscose fiber.

9. The functional viscose fiber according to claim 1, the non-carbon non-oxygen elements account for 0.03 wt % to 1 wt % of the functional viscose fiber.

10. The functional viscose fiber according to claim 1, wherein the graphene structure has a thickness of less than or equal to 100 nanometers.

11. The functional viscose fiber according to claim 1, the graphene structure is one or a combination of more of carbon six-membered ring honeycomb lamellar structures having 1-10 layers.

12. The functional viscose fiber according to claim 1, wherein the non-carbon non-oxygen element further comprises one or more of P, Ca, Na, Ni, Mn, K, Mg, Cr, S and Co; the non-carbon non-oxygen elements account for 0.1 wt % to 1 wt % of the functional viscose fiber.

* * * * *